US011882267B2

(12) United States Patent
Ninan et al.

(10) Patent No.: US 11,882,267 B2
(45) Date of Patent: Jan. 23, 2024

(54) ADAPTING VIDEO IMAGES FOR WEARABLE DEVICES

(71) Applicant: Dolby Laboratories Licensing Corporation, San Francisco, CA (US)

(72) Inventors: Ajit Ninan, San Jose, CA (US); Neil Mammen, San Jose, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 1121 days.

(21) Appl. No.: 15/949,720

(22) Filed: Apr. 10, 2018

(65) Prior Publication Data

US 2018/0295352 A1 Oct. 11, 2018

Related U.S. Application Data

(60) Provisional application No. 62/484,148, filed on Apr. 11, 2017.

(51) Int. Cl.
H04N 13/344 (2018.01)
H04N 13/383 (2018.01)
G06F 3/01 (2006.01)
H04N 13/117 (2018.01)
G06F 3/0346 (2013.01)
H04N 13/332 (2018.01)
H04N 13/279 (2018.01)
H04N 13/271 (2018.01)

(52) U.S. Cl.
CPC ......... H04N 13/344 (2018.05); G06F 3/012 (2013.01); G06F 3/0346 (2013.01); H04N 13/117 (2018.05); H04N 13/332 (2018.05); H04N 13/383 (2018.05); G06F 3/013 (2013.01); H04N 13/271 (2018.05); H04N 13/279 (2018.05)

(58) Field of Classification Search
CPC .. H04N 13/344; H04N 13/332; H04N 13/383; H04N 13/117; H04N 13/271; H04N 13/279; G06F 3/012; G06F 3/013; G06F 3/0346
See application file for complete search history.

(56) References Cited

U.S. PATENT DOCUMENTS

| 5,574,836 A * | 11/1996 | Broemmelsiek ..... H04N 13/279 348/E13.019 |
| 8,803,873 B2 * | 8/2014 | Yoo ..................... H04N 21/812 715/848 |
| 2005/0057563 A1 * | 3/2005 | Shum et al. |
| 2011/0193863 A1 * | 8/2011 | Gremse ................ H04N 13/351 345/419 |

(Continued)

FOREIGN PATENT DOCUMENTS

WO 2018/191312 10/2018

Primary Examiner — Nitin Patel
Assistant Examiner — Saifeldin E Elnafia

(57) ABSTRACT

A spatial direction of a wearable device that represents an actual viewing direction of the wearable device is determined. The spatial direction of the wearable device is used to select, from a multi-view image comprising single-view images, a set of single-view images. A display image is caused to be rendered on a device display of the wearable device. The display image represents a single-view image as viewed from the actual viewing direction of the wearable device. The display image is constructed based on the spatial direction of the wearable device and the set of single-view images.

19 Claims, 11 Drawing Sheets

(56) References Cited

U.S. PATENT DOCUMENTS

| | | | |
|---|---|---|---|
| 2015/0009304 A1* | 1/2015 | Linge | H04N 13/302 |
| | | | 348/51 |
| 2016/0035140 A1* | 2/2016 | Bickerstaff | G02B 27/0179 |
| | | | 345/633 |
| 2016/0216518 A1* | 7/2016 | Raghoebardajal | G06F 3/011 |
| 2017/0075416 A1* | 3/2017 | Armstrong | |
| 2018/0081178 A1 | 3/2018 | Shpunt | |
| 2018/0293752 A1 | 10/2018 | Ninan | |
| 2018/0295351 A1 | 10/2018 | Ninan | |

* cited by examiner determine a spatial direction of a wearable device 402 use the spatial direction to select, from a multi-view image, a set of single-view images 404 cause a display image to be rendered on a device display of the wearable device, the display image constructed based on the spatial direction and the set of single-view images 406

FIG. 4A determine a spatial direction of a wearable device
452 receive a a set of single-view images selected from multi-view image based on the spatial direction 454 construct a display image to be rendered on a device display of the wearable device based on the spatial direction and the set of single-view images
456

FIG. 4B

ADAPTING VIDEO IMAGES FOR WEARABLE DEVICES

CROSS-REFERENCE TO RELATED APPLICATIONS

This application claims the benefit of priority from U.S. Provisional Patent Application No. 62/484,148, filed Apr. 11, 2017, which is hereby incorporated by reference in its entirety.

TECHNICAL FIELD

The present invention relates generally to video images, and in particular, to adapting video images for wearable devices.

BACKGROUND

Wearable devices may be used in a wide variety of display applications such as those related to virtual reality (VR) and augmented reality (AR), mixed reality (MR), telepresence, telemedicine, 3D video, omnidirectional video, etc. To add dynamism and interaction into viewer experience, such an application can directly or indirectly monitor spatial positions and viewing directions of a wearable device, caused by physical movements of the wearable device or a viewer thereof. The display application can further adapt displayed imagery based on the spatial positions and the viewing directions of the wearable device.

However, the amount of video data to support a seamless experience in viewing video images at a spatial resolution at the highest visual acuity in different viewing directions at all time may be very large. The delivery of large amounts of video data can be difficult to do in many operational scenarios, especially in a place such as cinema, etc., where numerous wearable devices or viewers may be involved.

In addition, to process a large amount of video data, a wearable device may incur a significant time lag (e.g., longer than 12-15 milliseconds, etc.) between a first time when the wearable device changes to a new viewing direction and a second later time when high quality image content is rendered in the wearable device in accordance with the new viewing direction. This time lag may be readily perceivable by the viewer and causes deterioration in viewer experience. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4A and FIG. 4B illustrate example process flows; and

DESCRIPTION OF EXAMPLE EMBODIMENTS

Figure 1A:
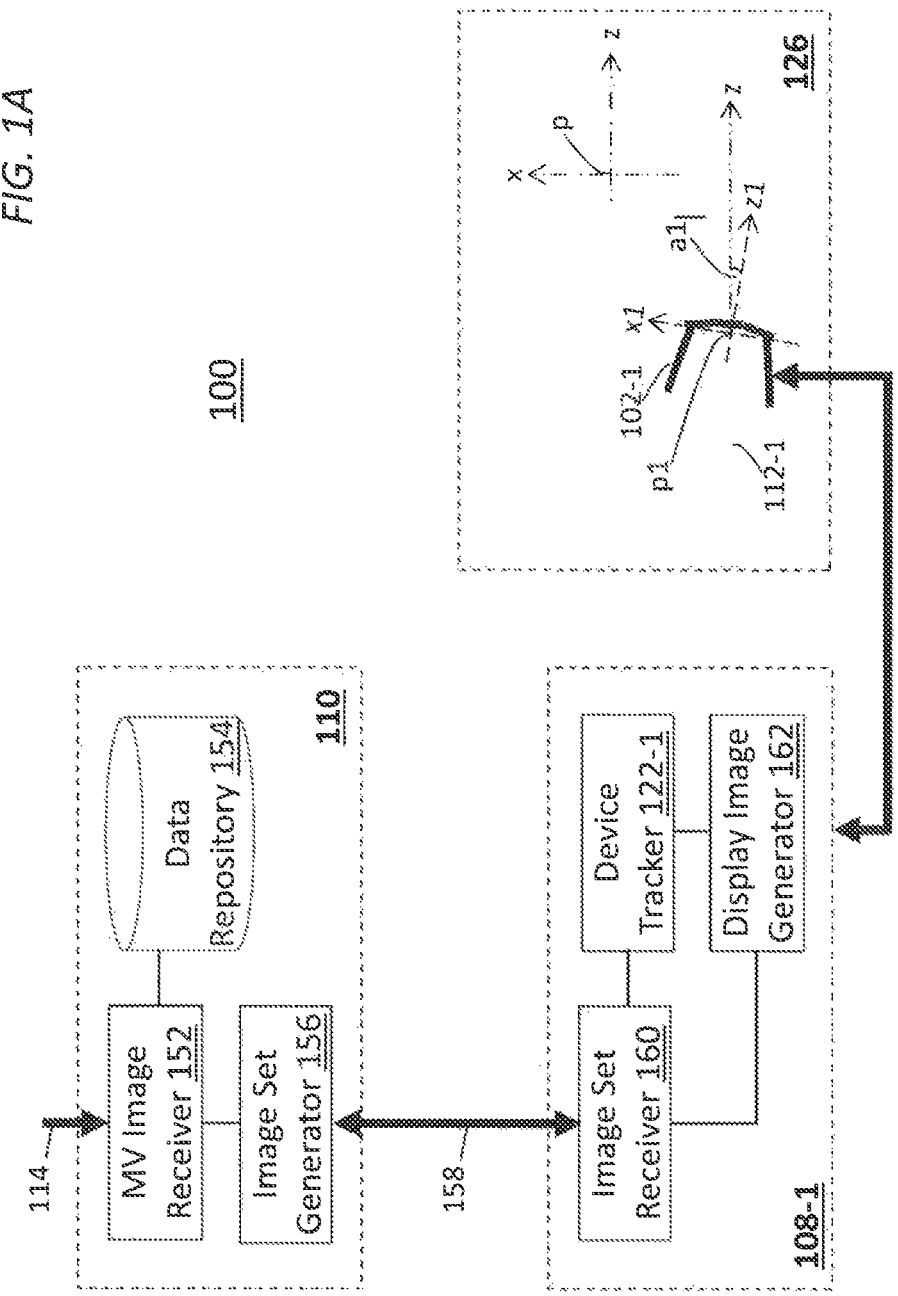
FIG. 1A through FIG. 1C illustrate example configurations of entertainment systems that involve image reconstruction based on image sets.

Example embodiments, which relate to adapting video images for wearable devices, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. General Overview
2. Example Entertainment Systems
3. External Device Tracking
4. Inside-Out Device Tracking
5. Image Set Generation
6. Image Reconstruction Based on Image Set
7. Transmitting Image Sets with Low Bandwidth
8. Example Process Flows
9. Implementation Mechanisms—Hardware Overview
10. Equivalents, Extensions, Alternatives and Miscellaneous

1. General Overview

This overview presents a basic description of some aspects of an example embodiment of the present invention. It should be noted that this overview is not an extensive or exhaustive summary of aspects of the example embodiment. Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be used with 3D technologies to provide entertainment experiences. These entertainment experiences may be provided with shared displays such as those related to any of: Dolby 3D, RealD, linear polarization based 3D, circular polarization based 3D, spectral spatial separation based 3D, etc. The entertainment experiences may also be provided with movable device displays such as those related to image projectors on wearable devices, AR displays, HoloLens displays, Magic Leap displays, Mixed Reality (MR) displays, tensor displays, volumetric displays, light field (LF) displays, Immy displays, Meta displays, etc. Example wearable devices and device displays can be found in U.S. Provisional Patent Application No. 62/484,157, with an application title of "AUGMENTED 3D ENTERTAINMENT SYSTEMS" by Ajit Ninan and Neil Mammen, filed on Apr. 11, 2017, the entire contents of which are hereby incorporated by reference as if fully set forth herein.

Multi-view images may involve relatively large amounts of video data and require relatively large network bandwidth to stream from a server to a client device. This is especially challenging in low-delay image processing/rendering operations related to real time video applications, near-real-time video applications, non-real-time video applications, VR applications, AR applications, remote presence applications, automobile entertainment applications, helmet mounted display applications, heads up display applications, games, 2D display applications, 3D display applications, multi-view display applications, etc.

Techniques as described herein can be used to minimize bandwidth usages and network delays for streaming multi-view image data between video streaming server(s) and video streaming client(s). Spatial positions and/or spatial directions of a wearable device may be monitor or tracked in real time or in near real time by one or more of: external device trackers, internal device trackers, inside-out device trackers, outside-in device trackers, etc.

The spatial positions and/or spatial directions of the wearable device may be provided to an upstream device (e.g., video streaming server, etc.) to select a limited set of single-view images from relatively numerous single-view images in a multi-view image. Instead of sending all the image data of the multi-view image to a downstream client device, the limited set of single-view images is sent to the downstream client device.

The limited set of single-view images may represent a sparse light field image representation of the multi-view image. The sparse light field image covers two, three, four or more viewing directions around the actual spatial direction of the wearable device. Through (e.g., end-point, downstream device performed, recipient performed, etc.) image interpolation/reconstruction, single-view images in the limited set of single-view images can be used to generate a single-view image corresponding to the actual spatial direction of the wearable device.

Additionally, optionally or alternatively, the image interpolation/reconstruction operations based on image sets can be extended to generate individual single-view images for the left view and the right view of the wearable device, respectively.

The image set that is transmitted from the upstream device to the downstream device may carry image data of hierarchical image quality levels. These image quality levels correspond to differentiated levels in image related properties such as spatial resolutions, frame rates, dynamic ranges, color gamuts, etc.

A focus region that represents only a very tiny region in the viewer's entire vision field can be given the highest quality image data while other regions of the viewer's vision field can be given relatively low quality image data that has been greatly compressed and/or downsampled from image data of the highest available quality.

For example, the image set may include a subset of relatively low spatial resolution downsampled images of two or more viewing directions. Each of the relatively low spatial resolution downsampled images covers a field of vision supported by a device display of the wearable device. In the meantime, the image set may include a subset of relatively high spatial resolution images of the two or more viewing directions. Each of the relatively high spatial resolution images covers the focus region in accordance with an eye gaze direction of the viewer in real time or in near real time.

Instead of sending all the highest image quality single-view images in the image set with relatively large data volumes, (e.g., downsampled, size compressed, resolution compressed etc.) images with much less data volumes in the image set are sent to a downstream device for generating and rendering a display image based on image interpolation/reconstruction performed on the image data of the image set.

Since the human vision system is relatively not sensitive to spatial acuity outside of a focus region, techniques as described herein can be used to minimize network bandwidth requirements, to meet stringent delay requirements, and in the meantime to support a seamless viewing experience that is relatively free from visual artifacts, physiological discomforts, etc., associated with some other approaches that do not adopt the techniques as described herein. The visual artifacts, physiological discomforts, etc., associated with the other approaches may include, but are not necessarily limited to, any of: motion artifacts such as unable to maintain smooth pursuit, prolonged lags in transitioning to high resolution imagery as perceived by the human vision, low resolution imagery noticeable within a focal viewing area of the human vision, mismatches between a user's natural vision-related intuition and omnidirectional video content as actually rendered to the user, sudden drop of visual clarity in imagery when a viewer moves viewing angles, perceptible slow transitioning from low resolutions to high resolutions, showing fuzzy images for previously occluded image details when a viewer moves viewing angles, etc.

Example embodiments described herein relate to image reconstruction. A spatial direction of a wearable device is determined. The spatial direction of the wearable device represents an actual viewing direction of the wearable device at a first time point. The spatial direction of the wearable device that represents the actual viewing direction of the wearable device is used to select, from a multi-view image comprising a plurality of single-view images, a set of two or more single-view images corresponding to a set of two or more viewing directions at the first time point. Each single-view image in the plurality of single-view images in the multi-view image (a) corresponds to a respective viewing direction in a plurality of viewing directions and (b) represents a view of the multi-view image from the respective viewing direction. A display image is caused to be rendered on a device display of the wearable device. The display image represents a single-view image as viewed from the actual viewing direction of the wearable device at the first time point. The display image is constructed based at least in part on the spatial direction of the wearable device and the set of two or more single-view images corresponding to the set of two or more viewing directions.

Example embodiments described herein relate to image reconstruction. A spatial direction of a wearable device is determined. The spatial direction of the wearable device representing an actual viewing direction of the wearable device at a first time point. A set of two or more single-view images corresponding to a set of two or more viewing directions at the first time point is received. The spatial direction of the wearable device is used to select, from a multi-view image comprising a plurality of single-view images, single-view images into the set of two or more single-view images. Each single-view image in the plurality of single-view images in the multi-view image (a) corresponds to a respective viewing direction in a plurality of viewing directions and (b) represents a view of the multi-view image from the respective viewing direction. A display image is constructed based at least in part on the spatial direction of the wearable device and the set of two or more single-view images corresponding to the set of two or more viewing directions. The display image is rendered on a device display of the wearable device. The display image represents a single-view image as viewed from the actual viewing direction of the wearable device at the first time point.

In some example embodiments, mechanisms as described herein form a part of a media processing system, including but not limited to any of: cloud-based server, mobile device, virtual reality system, augmented reality system, head up display device, helmet mounted display device, CAVE-type system, wall-sized display, video game device, display device, media player, media server, media production system, camera systems, home-based systems, communication devices, video processing system, video codec system, studio system, streaming server, cloud-based content service system, a handheld device, game machine, television, cinema display, laptop computer, netbook computer, tablet computer, cellular radiotelephone, electronic book reader, point of sale terminal, desktop computer, computer workstation, computer server, computer kiosk, or various other kinds of terminals and media processing units.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. Example Entertainment Systems

FIG. 1A illustrates an example configuration 100 of an (e.g., augmented, etc.) entertainment system that comprises an image content receiver 110, a device image renderer 108-1, one or more wearable devices such as a wearable (image rendering) device 102-1 of a viewer 112-1, etc., in a 3D space 126 such as a cinema, home, etc. The image content receiver (110) comprises a multi-view (MV) image receiver 152, an image set generator 156, a data repository 154, etc. The device image renderer (108-1) comprises an image set receiver 160, a device tracker 122-1, a display image generator 162, etc.

Some or all of the components/devices as depicted in FIG. 1A may be implemented by one or more mechanical components, one or more electrooptical components, one or more computing devices, modules, units, etc., in software, hardware, a combination of software and hardware, etc. Some or all of the components/devices as depicted in FIG. 1A may be communicatively (e.g., wirelessly, with wired connections, etc.) coupled with some other components/devices as depicted in FIG. 1A or with other components/devices not depicted in FIG. 1A.

In some embodiments, the image content receiver (110) comprises software, hardware, a combination of software and hardware, etc., configured to receive input image content 114 from an image source such as a cloud-based image source, a camera system in connection with a VR application, an AR application, a remote presence application, a display application, etc.; decode the input image stream (114) into one or more input multi-view images (e.g., a sequence of input multi-view images, etc.); etc.

Additionally, optionally or alternatively, in some embodiments, instead of receiving the one or more input multi-view images from an external image source, the multi-view image receiver (152) receives or retrieves the one or more input multi-view images from the data repository (154), which represents one or more databases, one or more data storage units/modules/devices, etc., configured to support operations such as storing, updating, retrieving, deleting, etc., with respect to some or all of the input multi-view images, etc.

In some embodiments, the image set generator (156) comprises software, hardware, a combination of software and hardware, etc., configured to receive, via a (e.g., bidirectional, etc.) data flow 158 from the device image renderer (108-1), positional and directional data of the wearable device (102-1) as tracked/monitored by the device tracker (122-1); establish/determine spatial positions and/or spatial directions of the wearable device (102-1) over time in relation to a reference coordinate system stationary in the 3D space (126); generate one or more image sets from the one or more multi-view images for the wearable device (102-1) in accordance with the spatial positions and/or spatial directions of the wearable device (102-1); encode the one or image sets into a video stream; provide/transmit, via the data flow (158), the video stream to the device image renderer (108-1); etc.

Additionally, optionally, or alternatively, some or all of image processing operations such as image rotation determination, image alignment analysis, scene cut detections, transformation between coordinate systems, temporal dampening, display management, content mapping, color mapping, field-of-view management, etc., may be performed by the image content receiver (110).

The image content server (110) may be used to support real time video applications, near-real-time video applications, non-real-time video applications, VR applications, AR applications, remote presence applications, automobile entertainment applications, helmet mounted display applications, heads up display applications, games, 2D display applications, 3D display applications, multi-view display applications, etc.

The viewer (112-1) may make movements to cause changes in spatial positions and spatial directions of the wearable device (102-1) at runtime. In some embodiments, the device tracker (122-1) comprises software, hardware, a combination of software and hardware, etc., configured to track/monitor the spatial positions and/or spatial directions of the wearable device (102-1); generate the positional and directional data of the wearable device (102-1) based on the spatial positions and/or spatial directions of the wearable device (102-1); etc.

The positional and directional data of the wearable device (102-1) may be of a relatively fine time resolution (e.g., every millisecond, every five milliseconds, etc.). The positional and directional data of the wearable device (102-1) may be used by the image content receiver (110) to establish/determine the spatial positions and/or spatial directions of the wearable device (102-1) at a given time resolution (e.g., every millisecond, every five milliseconds, etc.).

Examples of device trackers as described herein may include but are not necessarily limited to only, any of: external device trackers, outside-in device trackers, inside-out device trackers, etc. By way of example but not limitation, the device tracker (122-1) in the configuration (100) as illustrated in FIG. 1A represents one of an internal device tracker, an inside-out device tracker, as a part of the wearable device (102-1), collocated with the wearable device (102-1), co-moving with the wearable device (102-1), etc. The device tracker (122-1) operates to track spatial coordinates of the wearable device (102-1) in the 3D space (126).

Examples of the 3D space (126) may include, but are not necessarily limited to only, any of: a cinema, a theater, a concert hall, an auditorium, an amusement park, a bar, a home, a room, an exhibition hall, a venue, a bar, a ship, an airplane, etc. The 3D space (126) may be a three-dimensional volume, spatial positions in which can be represented in a three-dimensional spatial coordinate system (e.g., a reference coordinate system, a world coordinate system, etc.) stationary relative to the 3D space (126).

By way of illustration but not limitation, the reference three-dimensional coordinate system used to represent spatial positions in the 3D space (126) may be a reference Cartesian coordinate system depicted in the upper right corner of the 3D space (126). FIG. 1A depicts only two example spatial dimensions, namely an x-axis and a z-axis, of the reference Cartesian coordinate system; the reference Cartesian coordinate system may comprise another spatial dimension, namely a y-axis orthogonal to both the x and z axes, that points out from FIG. 1A. The reference Cartesian coordinate system may comprise a coordinate system origin at a reference spatial position denoted as "p" as shown in FIG. 1A. The reference spatial position "p" may be selected from any spatial position stationary to the 3D space (126).

The wearable device (102-1) may, but is not necessarily limited to only, to be a rigid-body device spatial positions on which can be represented in a device-stationary three-dimensional spatial coordinate system stationary relative to the wearable device (102-1). The device-stationary Cartesian coordinate system can be used to represent spatial positions and spatial directions on the wearable device (102-1). The device-stationary Cartesian coordinate system comprises three spatial dimensions represented by respective axes including an x1-axis and a z1-axis as shown in FIG. 1A, and a y1-axis orthogonal to both the x1 and z1 axes that is not depicted in FIG. 1A. The device-stationary Cartesian coordinate system may comprise a coordinate system origin at a device-stationary spatial position denoted as "p1" as shown in FIG. 1A. The device-stationary spatial position "p1" may be selected from a spatial position stationary to the wearable device (102-1). In some embodiments, if there is a spatial location that is a point of symmetry on the wearable device (102-1), then such spatial location can be selected as the device-stationary spatial position "p1" to serve as the coordinate origin to the device-stationary Cartesian coordinate system.

In some embodiments, the device tracker (122-1) repeatedly (e.g., in real time, in near real time, within a strict timing budget, every 1 millisecond, every 2 milliseconds, etc.) tracks or determines one or more spatial coordinates of the wearable device (102-1) at a given time point in a plurality of time points in the reference Cartesian coordinate system of the 3D space (126). In some embodiments, the one or more spatial coordinates of the wearable device (102-1) may be represented by one or more spatial coordinates of the device-stationary spatial position "p1" that is stationary to the wearable device (102-1) in reference to the reference Cartesian coordinate system in the 3D space (126).

Spatial coordinates of the device-stationary spatial location "p1" of the wearable device (102-1) over time constitutes a spatial trajectory of the wearable device (102-1) that may be represented as functions of time. Any combination of one or more motion characteristics of the wearable device (102-1) may be determined from these functions of time representing the spatial trajectory of the wearable device (102-1).

For example, linear positions/displacements (over time) of the wearable device (102-1) in relation to a reference point—such as the origin "p" of the reference Cartesian coordinate system—stationary in the 3D space (126) may be determined or derived (e.g., as a vector difference, etc.) from the spatial trajectory (represented by the functions of time as previously mentioned) of the wearable device (102-1). Additionally, optionally or alternatively, linear velocities, speeds, accelerations, etc., (over time) of the wearable device (102-1) in relation to the reference point stationary in the 3D space (126) may be determined or derived (e.g., as a first-order derivative, as a second-order derivative, etc.) from the spatial trajectory of the wearable device (102-1).

Similarly, angular positions/displacements (e.g., a1, etc.) (over time) of the wearable device (102-1) may be determined or derived from angular positions/displacements of the device-stationary coordinate system (e.g., x1, y1, z1, etc.) in relation to the reference Cartesian coordinate system (e.g., x, y, z, etc.).

Additionally, optionally or alternatively, linear or angular velocities, speeds, accelerations, etc., (over time) of the wearable device (102-1) in relation to the reference coordinate system in the 3D space (126) may be determined or derived (e.g., as a first-order derivative, as a second-order derivative, etc.) from the linear or angular positions/displacements (e.g., p1, a1, etc.) of the wearable device (102-1).

Examples of the device image renderer (108-1) may include, but are not necessarily limited to only, any of: a central image renderer, a distributed image renderer, an image renderer implemented as a part of the wearable device (102-1), an image renderer external to the wearable device (102-1), an image renderer partly implemented as a part of the wearable device (102-1) and partly implemented in a separate device external to the wearable device (102-1), etc.

In some embodiments, the image set receiver (160) in the device image renderer (108-1) comprises software, hardware, a combination of software and hardware, etc., configured to send, via the data flow (158) to the image content receiver (110), the positional and directional data of the wearable device (102-1) as tracked/monitored by the device tracker (122-1); receive the video stream encoded with the one or more image sets generated from the one or more multi-view images in accordance with the positional and directional data of the wearable device (102-1); etc.

In some embodiments, the display image generator (162) generates one or more device display images from the one or more image sets generated from the one or more multi-view images for the wearable device (102-1) in accordance with the positional and directional data of the wearable device (102-1); causes the one or more device display images to be rendered with the wearable device (102-1) to the viewer (112-1); etc. The device image renderer (108-1) can communicate control information, status information, positional data, image data such as the device images, metadata, etc., with wearable devices (e.g., 102-1, etc.) over one or more data connections. Example data connections may include, but are not limited, wireless data connections, wired data connections, radio-frequency based data connections, cellular data connections, Wi-Fi data connections, infrared-based data connections, data connections over HDMI cable, data connections over optical cable, data connections over High-Speed Serial Interface (HSSI), High- Definition Serial Digital Interface (HD-SDI), 12G-SDI, USB cable, and the like to seat/armrest/floor, etc.

Additionally, optionally, or alternatively, some or all of image rendering operations such as viewing direction tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the device image renderer (108-1).

The device image renderer (108-1) may be used to support real time video applications, near-real-time video applications, non-real-time video applications, VR applications, AR applications, remote presence applications, automobile entertainment applications, helmet mounted display applications, heads up display applications, games, 2D display applications, 3D display applications, multi-view display applications, etc.

Techniques as described herein can be implemented in a variety of system architectures. Some or all image processing operations as described herein can be implemented by one or more cloud-based video streaming servers, video streaming servers collocated with or incorporated into wearable devices, video streaming clients, image content receivers, image renderers, etc. Based on one or more factors such as types of video applications, bandwidth/bitrate budgets, computing capabilities, resources, loads, etc., of recipient devices, computing capabilities, resources, loads, etc., of video streaming servers, image content receivers, image renderers, underlying computer networks, etc., some image processing operations can be performed by an image content receiver, while some other image processing operations can be performed by an image renderer or even by a wearable device, etc.

3. External Device Tracking

Figure 1B:
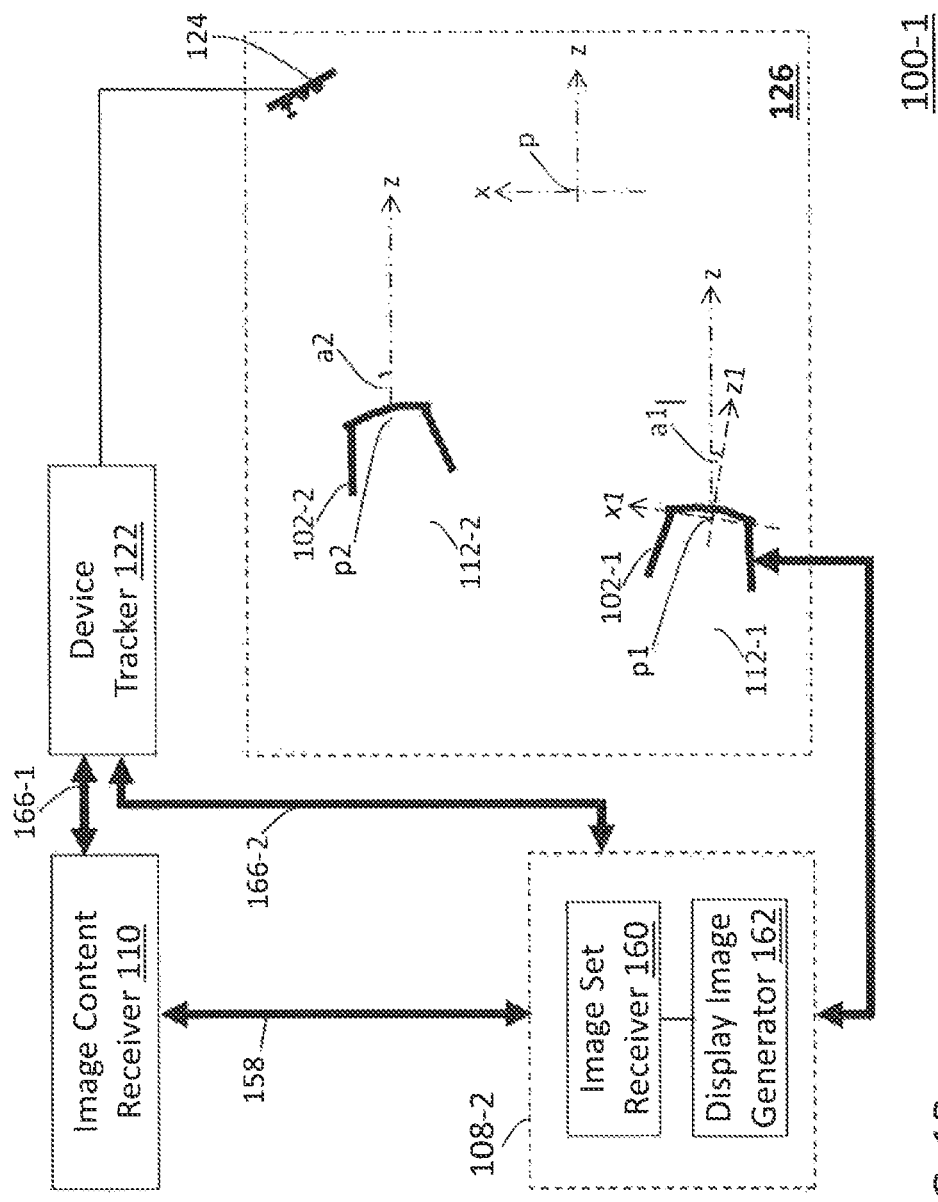

FIG. 1B illustrates an example configuration 100-1 of an (e.g., augmented, etc.) entertainment system that comprises an image content receiver (e.g., 110, etc.), a device image renderer 108-2, a device tracker 122, one or more wearable devices such as a first wearable (image rendering) device (e.g., 102-1, etc.) of a first viewer 112-1, a second wearable (image rendering) device (e.g., 102-2, etc.) of a second viewer 112-2, etc., in a 3D space (e.g., 126, etc.) such as a cinema, home, etc. The device image renderer (108-2) comprises an image set receiver (e.g., 160, etc.), a display image generator (e.g., 162, etc.), etc.

Some or all of the components/devices as depicted in FIG. 1B may be implemented by one or more mechanical components, one or more electrooptical components, one or more computing devices, modules, units, etc., in software, hardware, a combination of software and hardware, etc. Some or all of the components/devices as depicted in FIG. 1B may be communicatively (e.g., wirelessly, with wired connections, etc.) coupled with some other components/devices as depicted in FIG. 1B or with other components/devices not depicted in FIG. 1B.

By way of example but not limitation, the device tracker (122) in the configuration (100-1) as illustrated in FIG. 1B represents one of an external device tracker, an outside-in device tracker, external to the wearable devices (102-1 and 102-2), away from the wearable devices (102-1 and 102-2), away from the viewers (112-1 and 112-2) of the wearable devices (102-1 and 102-2), etc. Other devices such as the image content receiver (110), the device image renderer (108-2), etc., may or may not have their own device tracking capabilities. In some embodiments, some or all of these other devices rely on the device tracker (122) to track or monitor spatial locations and/or spatial directions of the wearable devices (102-1 and 102-2) in the 3D space (126). Example external device trackers can be found in U.S. Provisional Patent Application No. 62/484,131, with an application title of "PASSIVE MULTI-WEARABLE-DEVICES TRACKING" by Ajit Ninan and Neil Mammen, filed on Apr. 11, 2017, the entire contents of which are hereby incorporated by reference as if fully set forth herein.

In some embodiments, the device tracker (122) operating in conjunction with a tracking sensor assembly (e.g., 124, etc.) the latter of which is deployed in the 3D space (126) repeatedly (e.g., in real time, in near real time, within a strict timing budget, every 1 millisecond, every 2 milliseconds, etc.) tracks or determines one or more spatial coordinates of each of the wearable devices (102-1 and 102-2) at a given time point in the reference Cartesian coordinate system of the 3D space (126). In some embodiments, the one or more spatial coordinates of each of the wearable devices (102-1 and 102-2) may be represented by one or more spatial coordinates of a device-stationary spatial position (denoted as "p1" or "p2") that is stationary to each such wearable device (102-1 or 102-2) in reference to the reference Cartesian coordinate system.

Spatial coordinates of the device-stationary spatial location ("p1" or "p2") of each of the wearable devices (102-1 or 102-2) constitute a spatial trajectory of each such wearable device (102-1 or 102-2). The spatial trajectory may be represented as functions of time. Any combination of one or more motion characteristics of each of the wearable devices (102-1 or 102-2) may be determined from these functions of time representing the spatial trajectory of each such wearable device (102-1 or 102-2). Additionally, optionally or alternatively, linear or angular velocities, speeds, accelerations, etc., (over time) of each of the wearable devices (102-1 or 102-2) in relation to the reference coordinate system in the 3D space (126) may be determined or derived (e.g., as a first-order derivative, as a second-order derivative, etc.) from linear or angular positions/displacements (e.g., p1, a1, p2, a2, etc.) of each such wearable device (102-1 or 102-2).

The image content receiver (110) may receive input image content (e.g., 114, etc.) from an image source such as a cloud-based image source, a camera system in connection with a VR application, an AR application, a remote presence application, a display application, etc.; decode the input image stream (114) into one or more input multi-view images (e.g., a sequence of input multi-view images, etc.); etc. Additionally, optionally or alternatively, in some embodiments, instead of receiving the one or more input multi-view images from an external image source, the image content receiver (110) may receive or retrieve some or all of the one or more input multi-view images from an internal data repository (154).

In some embodiments, the image content receiver (110) receives, via a (e.g., bidirectional, etc.) data flow 158 from the device image renderer (108-2), positional and directional data of each of the wearable devices (102-1 or 102-2) as tracked/monitored by the device tracker (122); establish/determine spatial positions and/or spatial directions of each such wearable device (102-1 or 102-2) over time in relation to the reference Cartesian coordinate system; generate one or more image sets from the one or more multi-view images for each of the wearable devices (102-1 or 102-2) in accordance with the spatial positions and/or spatial directions of each such wearable device (102-1 or 102-2); encode the one or image sets for each such wearable device (102-1 or 102-2) into a respective video stream; provide/transmit, via the data flow (158), respective video streams for the wearable devices (to the device image renderer (108-2); etc.

In some embodiments, the positional and directional data of each of the wearable devices (102-1 or 102-2) as received by the image content receiver (110) via the data flow (158) from the device image renderer (108-2) are originally provided to the device image renderer (108-2) by the device tracker (122) via a data flow 166-2. In some other embodiments, instead of receiving the positional and directional data of each of the wearable devices (102-1 or 102-2) from the device image renderer (108-2) via the data flow (158), the image content receiver (110) directly receives, via a (e.g., bidirectional, etc.) data flow 166-1 from the device tracker (122), the positional and directional data of each of the wearable devices (102-1 or 102-2) as tracked/monitored by the device tracker (122)

A viewer (e.g., 112-1, 112-2, etc.) may make movements to cause changes in spatial positions and spatial directions of a wearable device (e.g., 102-1, 102-2, etc.) at runtime. In some embodiments, the device tracker (122) generates the positional and directional data of the wearable device (102-1 or 102-2) based on the spatial positions and/or spatial directions of the wearable device (102-1 or 102-2). The positional and directional data of the wearable device (102-1 or 102-2) may be of a relatively fine time resolution (e.g., every millisecond, every five milliseconds, etc.). The positional and directional data of the wearable device (102-1 or 102-2) may be used by the image content receiver (110) to establish/determine the spatial positions and/or spatial directions of the wearable device (102-1 or 102-2) at a given time resolution (e.g., every millisecond, every five milliseconds, etc.).

Examples of the device image renderer (108-2) may include, but are not necessarily limited to only, any of: a central image renderer, a distributed image renderer, an image renderer implemented as a part of the wearable device (102-1), an image renderer external to the wearable device (102-1), an image renderer partly implemented as a part of the wearable device (102-1) and partly implemented in a separate device external to the wearable device (102-1), etc.

In some embodiments, the device image renderer (108-2) may operate with only a single wearable device (e.g., 102-1, etc.), or with more than one wearable device (e.g., 102-1 and 102-2, etc.) concurrently.

In some embodiments, the device image renderer (108-2) receives video streams for the wearable devices (102-1 and 102-2). Each of the video streams is encoded with one or more image sets generated from the one or more multi-view images for a respective wearable device (102-1 or 102-2) in the wearable devices (102-1 and 102-2) in accordance with the positional and directional data of the respective wearable device (102-1 or 102-2).

In some embodiments, the display image generator (162) generates one or more device display images from one or more image sets generated from the one or more multi-view images for a respective wearable device (102-1 or 102-2) in the wearable devices (102-1 and 102-2) in accordance with the positional and directional data of the respective wearable device (102-1 or 102-2); causes the one or more display images to be rendered with the respective wearable device (102-1 or 102-2) to the viewer (112-1 or 112-2); etc. The device image renderer (108-2) can communicate control information, status information, positional data, image data such as the device images, metadata, etc., with wearable devices (e.g., 102-1, 102-2, etc.) over one or more data connections. Example data connections may include, but are not limited, wireless data connections, wired data connections, radio-frequency based data connections, cellular data connections, Wi-Fi data connections, infrared-based data connections, data connections over HDMI cable, data connections over optical cable, data connections over High-Speed Serial Interface (HSSI), High-Definition Serial Digital Interface (HD-SDI), 12G-SDI, USB cable, and the like to seat/armrest/floor, etc.

Additionally, optionally, or alternatively, some or all of image rendering operations such as viewing direction tracking, motion detection, position detection, rotation determination, transformation between coordinate systems, temporal dampening of time-varying image parameters, any other temporal manipulation of image parameters, display management, content mapping, tone mapping, color mapping, field-of-view management, prediction, navigations through mouse, trackball, keyboard, foot tracker, actual body motion, etc., may be performed by the device image renderer (108-2).

The device image renderer (108-2) may be used to support real time video applications, near-real-time video applications, non-real-time video applications, VR applications, AR applications, remote presence applications, automobile entertainment applications, helmet mounted display applications, heads up display applications, games, 2D display applications, 3D display applications, multi-view display applications, etc.

Figure 1C:
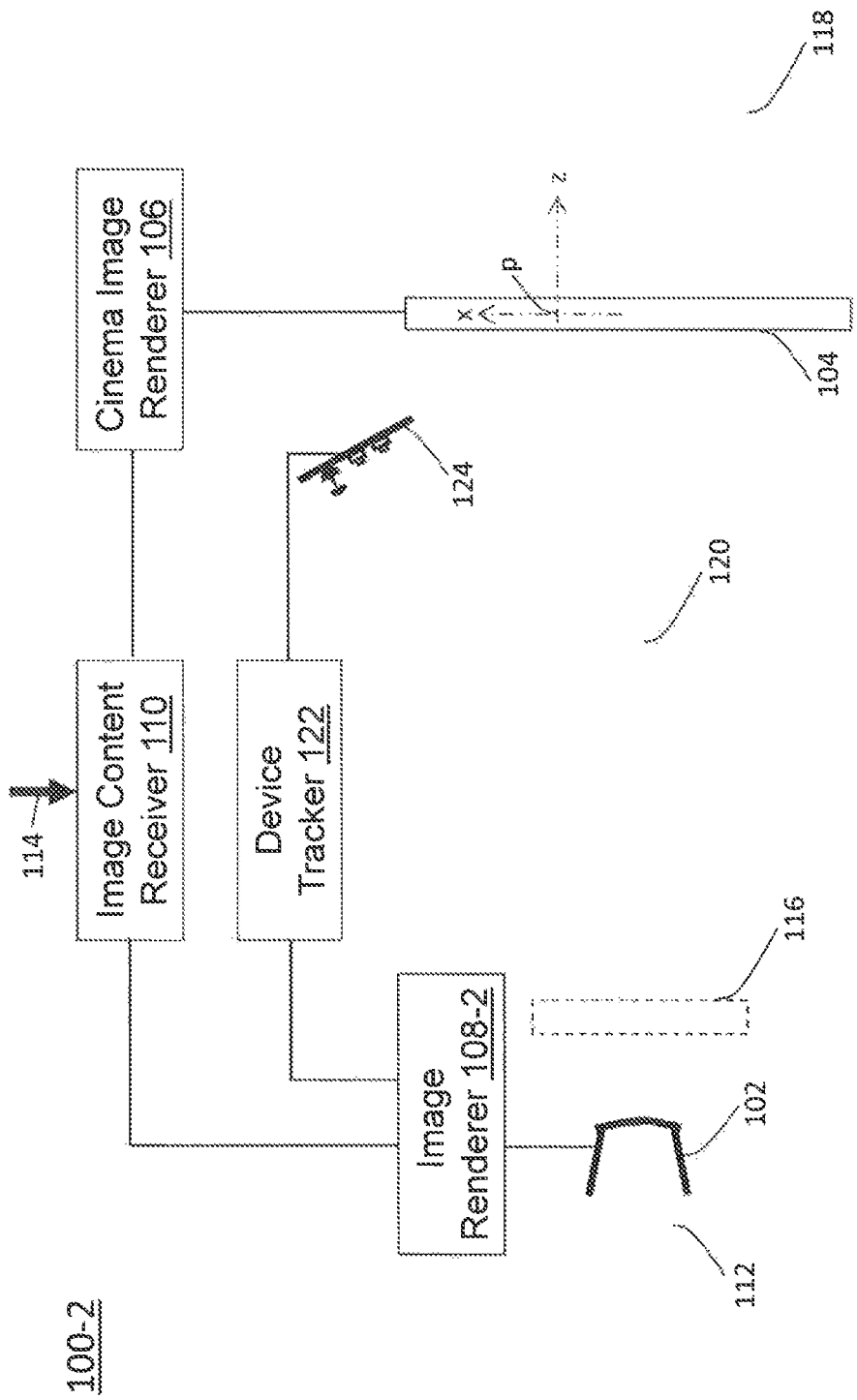

FIG. 1C illustrates an example configuration 100-2 of an augmented entertainment system that comprises a cinema image renderer 106, a device image renderer (e.g., 108-2, etc.), an image content receiver (e.g., 110, etc.), a cinema display 104, one or more wearable devices such as a wearable (image rendering) device 102, etc., in a 3D space (e.g., 126, etc.) such as a cinema, home, etc. Some or all of the components/devices as depicted in FIG. 1C may be implemented by one or more mechanical components, one or more electrooptical components, one or more computing devices, modules, units, etc., in software, hardware, a combination of software and hardware, etc. Some or all of the components/devices as depicted in FIG. 1C may be communicatively (e.g., wirelessly, with wired connections, etc.) coupled with some other components/devices as depicted in FIG. 1C or with other components/devices not depicted in FIG. 1C.

In some embodiments, the wearable device (102) may be driven, for example by the viewer (112), to make relative motions in relation to a reference Cartesian coordinate system in the 3D space (126). These relative motions may be represented by any combination of one or more of: linear positions/displacements, angular positions/displacements, linear velocities/speeds, angular velocities/speeds, linear accelerations, rotational accelerations, etc.

Specific spatial position and the specific spatial direction of the wearable device (102) may be generally characterized by six spatial dimensions, three of which relate to translations, and the other three of which relate to rotations. In some embodiments, the six spatial dimensions used to characterize of the specific spatial position and the specific spatial direction of the wearable device (102) are fully independent with respect to one another. In these embodiments, the wearable device (102) has six degrees of freedom. However, in some embodiments, it is possible that, due to positional or angular constraints, one or more degrees of freedom may be lost or removed from the six degrees of freedom.

In some embodiments, the device tracker (122) operating in conjunction with a tracking sensor assembly (e.g., 124, etc.) is deployed in the 3D space (126) monitors spatial positions and spatial directions of the wearable devices such as the wearable device (102), etc., in the 3D space (126).

In some embodiments, the device tracker (122) tracks or determines spatial positions and spatial directions of each of the wearable devices (including but not limited to the wearable device (102)) at a given time point (e.g., over a time interval, over the entire time duration of a 3D movie, etc.).

By way of example but not limitation, the input image content (114) is carried in a multi-layer multi-view video signal that comprises a cinema image layer and one or more device image layers for rendering one or more multi-view images. The image content receiver (110) can decode or demultiplex the multi-layer multi-view video signal, or the input image content (114) therein, into the cinema image layer and the one or more device image layers. Example image layers used in augmented entertainment systems can be found in U.S. Provisional Patent Application No. 62/484,121, with an application title of "LAYERED AUGMENTED ENTERTAINMENT EXPERIENCES" by Ajit Ninan, Neil Mammen and Tyrome Brown, filed on Apr. 11, 2017, the entire contents of which are hereby incorporated by reference as if fully set forth herein.

From the cinema image layer, the image content receiver (110) identifies or generates one or more multi-view single-layer cinema images. The one or more multi-view single-layer cinema images may depict a first proper subset of one or more visual objects (e.g., 118, etc.) in a plurality of visual objects (e.g., 118, 120, etc.) depicted by one or more multi-view (e.g., unlayered, etc.) images from which single-layer images in the cinema image layer and the device image layers were derived. The multi-view single-layer cinema images may be used to derive cinema display image to be rendered on by the cinema display (104).

From the one or more device image layers, the image content receiver (110) identifies or generates one or more multi-view single-layer device images. The one or more multi-view single-layer device images may depict one or more proper subsets of one or more visual objects (e.g., 120, etc.) in the plurality of visual objects (e.g., 118, 120, etc.) depicted by the one or more multi-view images from which single-layer images in the cinema image layer and the device image layers were derived. The multi-view single-layer device images may be used for selecting images to be included in image sets. The image sets can subsequently be used to derive device display image to be rendered on by one or more device displays of one or more wearable devices (e.g., 102, etc.) present in the 3D space (126).

In some embodiments, the image content receiver (110) sends or otherwise provides, the multi-view single-layer cinema images to the cinema image renderer (106). Furthermore, the image content receiver (110) sends or otherwise generates one or more image sets to the device image renderer (108-2). Each of the one or more image sets may comprise a subset of multi-view single-layer device images selected from the one or more multi-view single-layer device images.

Based on the single-layer cinema images, the cinema image renderer (106) can render cinema display images, on the cinema display (104). The cinema display images may comprise 2D cinema images, or 3D cinema images comprising left view cinema images and right view cinema images.

In some embodiments, the device image renderer (108-2) receives, from the device tracker (122), spatial positions and spatial directions of the wearable device (102) over time (e.g., over a time interval, over the entire time duration of a 3D movie, etc.). Based on the spatial positions and spatial directions of the wearable device (102), the device image renderer (108-2) can determine spatial relationships between the wearable device (102) and the cinema display (104). In some embodiment, these spatial relationships may be represented by one or more of: linear positions/displacements, angular positions/displacements, linear or angular velocities, linear or angular speeds, linear or angular accelerations, etc., of the wearable device (102) in relation to the cinema display (104) or the reference Cartesian coordinate system in the 3D space (126).

For example, based on the one or more image sets generated from the one or more second multi-view single-layer images, the device image renderer (108-2) can determine one or more 3D device images comprising one or more left view device images and one or more right view device images. The device image renderer (108-2) or the wearable device (102) may perform a spatial transformation on the one or more left view device images and the one or more right view device images—before rendering these images—based on the spatial relationships between the wearable device (102) and the cinema display (104).

Based on the left view device images and the right view device images as transformed by the spatial transformation, the device image renderer (108-2) can cause the wearable device (102) to render left view device display images and right view device display images on a device display 116 of the wearable device (102).

Examples of the cinema display (104) may be a screen display in a cinema, a display in a home entertainment system, etc. The cinema display (104) may be stationary in the 3D space (126).

In some embodiments, the device display (116) is not a physical display but rather an image plane or a virtual display created by light rays emitted by imager(s) in the wearable device (102). Example wearable devices and device displays can be found in U.S. Provisional Patent Application No. 62/484,157, with an application title of "AUGMENTED 3D ENTERTAINMENT SYSTEMS" by Ajit Ninan and Neil Mammen, filed on Apr. 11, 2017, the entire contents of which are hereby incorporated by reference as if fully set forth herein.

In some embodiments, the first proper subset of visual objects (e.g., 118, etc.) as rendered in the cinema display images on the cinema display (104) and the one or more second proper subsets of visual objects (e.g., 120, etc.) as rendered in the device display images on the wearable device (102) depict the plurality of visual objects (e.g., 118, 120, etc.) located at different spatial locations in a 3D space. These spatial locations in the 3D space may be the same as those specified or described in spatial information that was used to partition the plurality of visual objects into the multi-view single-layer cinema images in the cinema image layer (or the first proper subset of visual objects) and the multi-view single-layer device images in the one or more device image layers (or the one or more second proper subsets of visual objects) in the first place.

In some embodiments, the cinema image renderer (106) and/or the device image renderer (108-2) perform display management operations as a part of rendering (a) the cinema display images and/or (b) the device display images.

The configuration (100-2) of the augmented entertainment system may be used to support real time video applications, near-real-time video applications, non-real-time video applications, virtual reality (VR) applications, augmented reality (AR) applications, remote presence applications, automobile entertainment applications, helmet mounted display applications, heads up display applications, games, 2D display applications, 3D display applications, multi-view display applications, etc. For example, some or all of input image content data (114) can be generated or accessed by the image content receiver (110) in real time, in near real time, in non-real time, etc.

4. Inside-Out Device Tracking

Figure 2A:
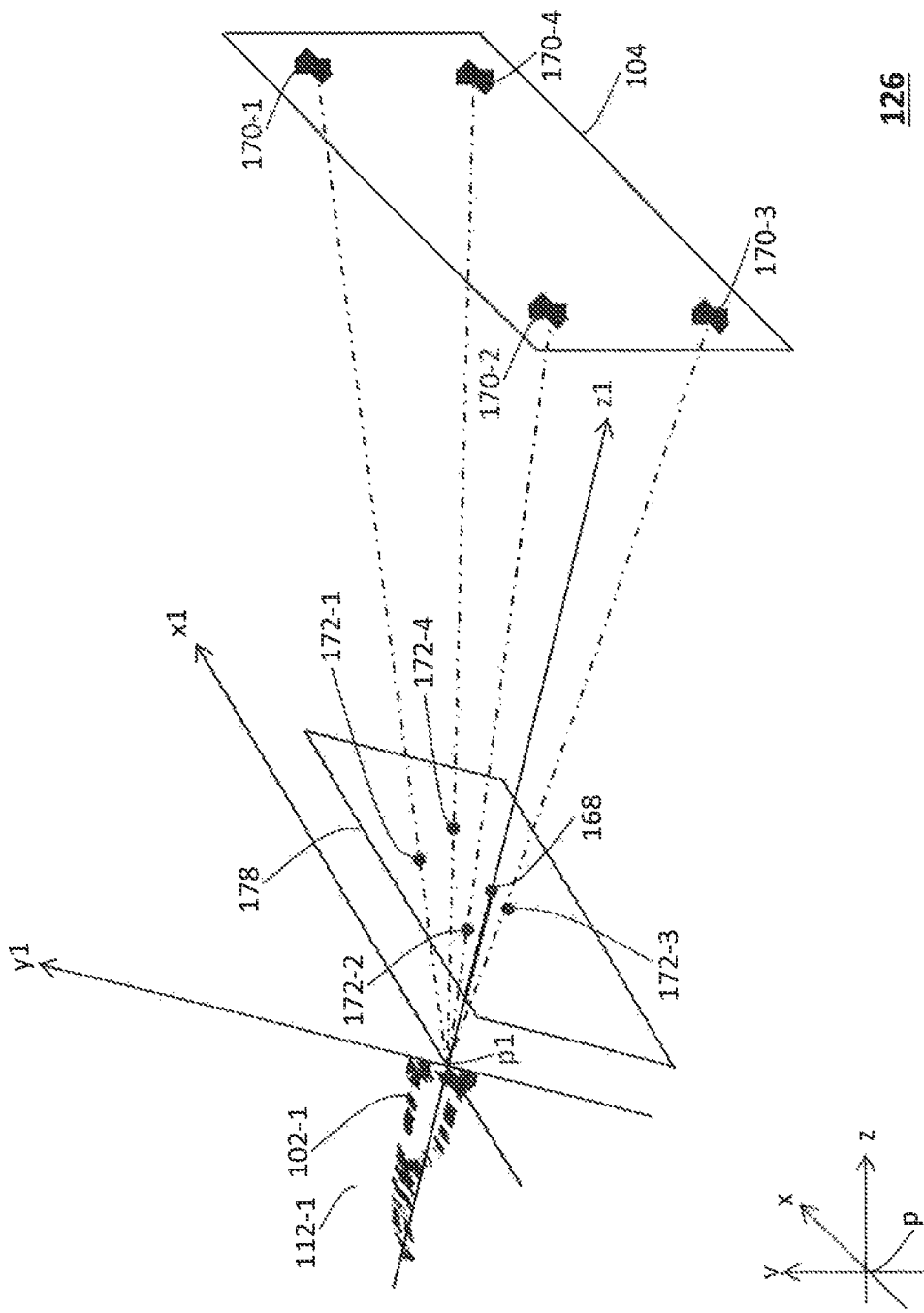
FIG. 2A illustrates example inside-out tracking by image sensors on a wearable device.

FIG. 2A illustrates example inside-out tracking by one or more image sensors on a wearable device (e.g., 102-1, etc.) as described herein, which is worn by a viewer (e.g., 112-1, etc.). Examples of the image sensors on the wearable device (102-1) may include, but are not necessarily limited to only, one or more of: infrared cameras, image sensors, etc.

In some embodiments, an image sensor's spatial position and spatial direction on the wearable device (102-1) have been calibrated before the wearable device (102-1) is used to view multi-view images as described herein. The image sensor as calibrated may be located at an image sensor center point stationary in relation to a representative spatial position of the wearable device (102-1) and with an image sensor optical axis with a fixed spatial direction relationship to a representative spatial direction of the wearable device (102-1).

Examples of the representative spatial position of the wearable device (102-1) may include, but are not necessarily limited to only, any of: the device-stationary spatial position "p1" of FIG. 1A, a point of symmetry, a mid-point along an interpupil distance between two eyes of a viewer, etc. Examples of the representative spatial direction of the wearable device (102-1) may include, but are not necessarily limited to only, any of: the z1 axis of the device-stationary coordinate system of the wearable device (102-1), one or more optical axes of one or more lenses of the wearable device (102-1), one or more optical axes of one or more optical stacks of the wearable device (102-1), a frontal central viewing direction of the wearable device (102-1), etc.

For the purpose of illustration only, the image sensor center point that represents the location of the image sensor on the wearable device (102-1) coincides with the representative spatial position (e.g., "p1", etc.) of the wearable device (102-1). It should be noted, however, that the image sensor center point in other embodiments may be located apart from the representative spatial position "p1" at a distance; thus, the center point and the representative position can be generally linked by a spatial translation. For the purpose of illustration only, the image sensor optical axis coincides with the representative spatial direction (e.g., "z1", etc.) of the wearable device (102-1). It should be noted, however, that the image sensor optical axis in other embodiments may form an angle from the representative spatial direction "z1"; thus, the optical axis and the representative direction can be generally linked by a spatial rotation.

A plurality of fiducial markers (e.g., 170-1 through 170-4, etc.) may be deployed at different spatial positions (e.g., on the cinema display, around the cinema display, on the ceiling, on the walls, etc.) in the 3D space (126). For the purpose of illustration only, the fiducial markers (e.g., 170-1 through 170-4, etc.) are located on the cinema display (104). These fiducial markers (e.g., 170-1 through 170-4, etc.) may be embedded in or superimposed on the images rendered on the cinema display (104). The fiducial markers (e.g., 170-1 through 170-4, etc.) may emit, reflect or regenerate light rays such as infrared light, etc., that can be captured by the image sensor on the wearable device (102-1) to form one or more fiducial mark tracking images.

In some embodiments, spatial coordinates of the spatial position of each of the different fiducial markers (e.g., 170-1 through 170-4, etc.) in reference to a reference coordinate system stationary to the 3D space (126) are known. As illustrated in FIG. 2A, the reference coordinate system may be a reference Cartesian coordinate system that comprise x, y and z axes and may be located at a specific spatial position "p" or a coordinate origin in the 3D space (126).

Each of the one or more fiducial mark tracking images captured by the image sensor on the wearable device (102-1) may comprise a plurality of imagery points (e.g., 172-1 through 172-4, etc.) generated in response to the light rays from the plurality of fiducial markers. For example, a first imager point (172-1) in the plurality of imagery points is generated in response to light rays from a first fiducial marker (170-1) in the plurality of fiducial markers; a second imager point (172-2) in the plurality of imagery points is generated in response to light rays from a second fiducial marker (170-2) in the plurality of fiducial markers; a third imager point (172-3) in the plurality of imagery points is generated in response to light rays from a third fiducial marker (170-3) in the plurality of fiducial markers; a fourth imager point (172-4) in the plurality of imagery points is generated in response to light rays from a fourth fiducial marker (170-4) in the plurality of fiducial markers.

Some or all of spatial coordinates of each of the imagery points (e.g., 172-1 through 172-4, etc.) in a device-stationary coordinate system stationary/relative to the image sensor can be determined based on pixel locations of each such imagery point in the one or more tracking images. For the purpose of illustration only, the device-stationary coordinate system stationary/relative to the wearable device (102-1) (or the image sensor) may comprise x1, y1 and z1 axes and may have a coordinate system origin located at the image sensor center point "p1" of the image sensor. In some embodiments, the image sensor center point "p1" of the image sensor may represent a center point of a lens, aperture, and/or an optical stack, used by the image sensor to collect incoming light rays, etc. Based on the pixel locations of an imagery point (e.g., 172-1, 172-2, 172-3, 172-4, etc.) in the one or more fiducial mark tracking images, the x1 and y1 spatial coordinates of the imagery point (e.g., 172-1, 172-2, 172-3, 172-4, etc.) in the device-stationary coordinate system stationary/relative to the wearable device (102-1) (or the image sensor) can be determined.

Based on the known individual spatial coordinates of each fiducial marker (e.g., 170-1, 170-2, 170-3, 170-4, etc.) in the plurality of fiducial markers (e.g., 170-1 through 170-4, etc.) in the coordinate system stationary to the 3D space (126) and x1 and y1 spatial coordinates of each corresponding imagery point (e.g., 172-1, 172-2, 172-3, 172-4, etc.) in the plurality of imagery points (e.g., 172-1 through etc.) in the device-stationary coordinate system stationary/relative to the image sensor, the wearable device (102-1) can determine a set of image sensor parameters (e.g., camera parameters, etc.) for the image sensor. The image sensor parameters may include, but are not necessarily limited to only, some or all of: spatial coordinates (in the x, y and z axes of the reference coordinate system in the 3D space (126)) of the image sensor center point "p1", spatial coordinates (in the x1, y1 and z1 axes of the device-stationary coordinate system) of a principal point 168 at which the image plane (178) is located/centered, spatial coordinates (in the x, y and z axes of the reference coordinate system in the 3D space (126)) of the principal point (168) at which the image plane (178) is located/centered, a focal length of the image sensor, pixel magnification factors, image skews, image radial distortions, a linear displacement/position of the device-stationary coordinate system in reference to the reference coordinate system in the 3D space (126), an angular displacement/position of the device-stationary coordinate system in reference to the reference coordinate system in the 3D space (126), etc.

Some image sensor parameters in the set of image sensor parameters for the image sensor may be determined less frequently than some other image sensor parameters in the set of image sensor parameters for the image sensor.

For example, some or all of the spatial coordinates in the x1, y1 and z1 axes of the device-stationary coordinate system of the principal point (168) at which the image plane (178) is located/centered, the focal length of the image sensor, the pixel magnification factors, the image skews, the image radial distortions, etc. may be determined by analyzing the image points (e.g., 172-1 through 172-4, etc.) and the fiducial marks (e.g., 170-1 through 170-4, etc.) before the wearable device (102-1) and the cinema (104) are used in an augmented entertainment session to render multi-view images to the viewer (112-1).

Some or all of the spatial coordinates (in the x, y and z axes of the reference coordinate system in the 3D space (126)) of the image sensor center point "p1", the spatial coordinates (in the x, y and z axes of the reference coordinate system in the 3D space (126)) of the principal point (168) at which the image plane (178) is located/centered, the linear displacement/position of the device-stationary coordinate system in reference to the reference coordinate system in the 3D space (126), the angular displacement/position of the device-stationary coordinate system in reference to the reference coordinate system in the 3D space (126), etc., can be repeatedly (e.g., in real time, in near real time, within a strict timing budget, every 1 millisecond, every 2 milliseconds, etc.) determined while the wearable device (102-1) and the cinema (104) are rendering multi-view images to the viewer (112-1).

Based at least in part on the set of image sensor parameters, the wearable device (102-1) can determine the (representative) spatial position and/or the (representative) spatial direction of the wearable device (102-1). In scenarios in which the image sensor center point does not coincide with the representative spatial position of the wearable device (102-1) and/or the image sensor optical axis does not coincide with the representative spatial direction of the wearable device (102-1), spatial translations and/or spatial rotations can be performed to determine the (representative) spatial position and/or the (representative) spatial direction of the wearable device (102-1) based on the image sensor center point and the image sensor optical axis as determined from analyzing the fiducial mark tracking images.

5. Image Set Generation

Figure 2B:
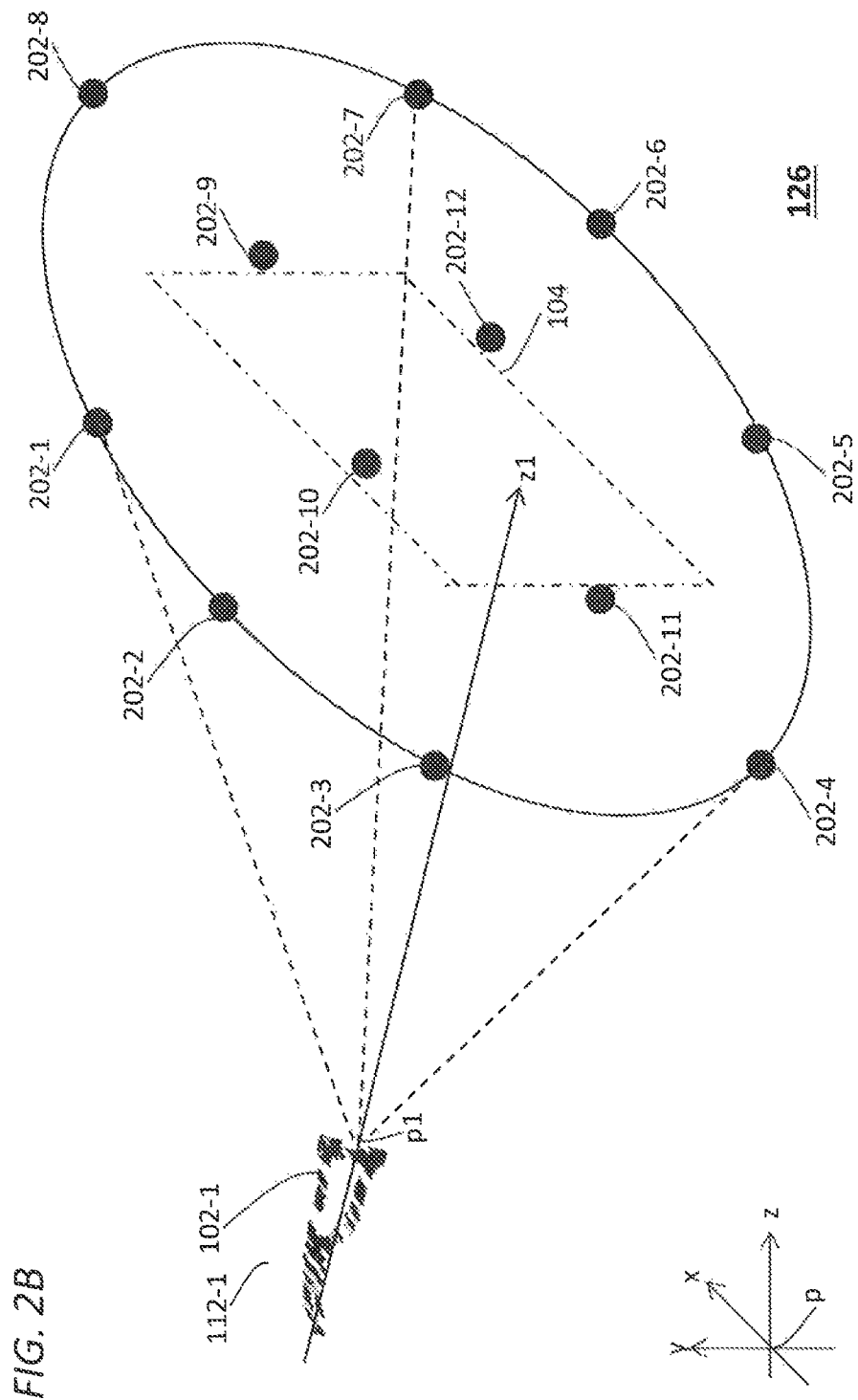
FIG. 2B illustrates an example image set generated from a multi-view image.

FIG. 2B illustrates an example image set generated from a corresponding (input) multi-view image in accordance with spatial positions and/or spatial directions of a wearable device (e.g., 102-1, etc.).

In some embodiments, an input multi-view image is received by an image content receiver (e.g., 110 of FIG. 1A through FIG. 1C, etc.) from any combination of one or more of: image sources, a data repositories, streaming servers, media broadcasting systems, etc.

In embodiments in which single-layer images in multiple image layers are used to partition visual objects in multi-view unlayered images, the input multi-view image may refer to either a multi-view unlayered image or a multi-view single-layer image derived from a multi-view unlayered image.

The multi-view image may be one among a sequence of multi-view images each of which is indexed to a respective (e.g., logical, media playing, actual, etc.) time point in a sequence of (e.g., consecutive, evenly time-wise spaced, etc.) time points. For the purpose of illustration only, the multi-view image in the present example is indexed to a first time point.

As used herein, a time point to which a multi-view image is indexed may refer to one of: a logical time point (e.g., a frame sequence number, etc.), a media playing time point, an actual (wall clock) time point, etc., at which display image(s) derived from the multi-view image are to be rendered. Each display image may be rendered at the time point within a specific time constraint/budget (e.g., within a designated image frame interval, within a fraction of a designated image frame interval, within a specific total time delay including but not limited to transmission delays and device tracking delays, within a relatively small fraction of an allocated image frame time at a given image refresh rate, etc.).

The input multi-view image may comprise a plurality of single-view images that corresponds to a plurality of different viewing angles (e.g., 202-1 through 202-12, etc.). Each single-view image in the plurality of single-view images in the multi-view image corresponds to a respective viewing direction in the plurality of viewing directions (e.g., 202-1 through 202-12, etc.). In other words, each single-view image in the plurality of single-view images of the multi-view image represents a view (or image) of the multi-view image as viewed from the respective viewing direction.

In some embodiments, the plurality of viewing directions (e.g., 202-1 through 202-12, etc.) supported by the multi-view image represents a plurality of discrete angles spanning over a solid angle in relation to the wearable device (201-1). The solid angle over which the plurality of viewing directions spans may, but is not necessarily limited to only, be larger than and/or inclusive of a solid angle spanned over by a cinema display (e.g., 104, etc.) up to a solid angle (e.g., $4\pi$ steradians, etc.) of an omnidirectional image. The solid angle over which the plurality of viewing directions spans may, but is not necessarily limited to only, be centered at a geometric center of the cinema display (104).

For example, the plurality of single-view images in the multi-view image may comprise a first single-view image that corresponds to a first viewing direction 202-1 in the plurality of viewing directions (e.g., 202-1 through 202-12, etc.), a second single-view image that corresponds to a second viewing direction 202-2 in the plurality of viewing directions (e.g., 202-1 through 202-12, etc.), etc.

Spatial coordinates of a wearable device (e.g., 102-1, etc.) may be tracked/monitored by one or more of: outside-in device trackers (e.g., 122, etc.), inside-out device trackers (e.g., 122-1, etc.), a combination of outside-in and inside-out device trackers.

In response to receiving positional and directional data of the wearable device (102-1) from the device tracker(s), the image content receiver (110) can establish/determine spatial positions and/or spatial directions of the wearable device (102-1) at a plurality of time points (e.g., every millisecond, every 5 milliseconds, every 20 milliseconds, every image frame interval, etc.) over time in relation to a reference coordinate system (e.g., a reference Cartesian coordinate system comprising x, y and z axes with a coordinate origin "p", etc.) of a 3D space (e.g., 126, etc.) in which the wearable device (102-1) resides.

For example, based on the positional and directional data of the wearable device (102-1), the image content receiver (110) determines a first spatial position "p1" and/or a first spatial direction "z1" of the wearable device (102-1) in relation to the reference coordinate system at the first time point. The first spatial direction "z1" of the wearable device (102-1) represents an actual viewing direction of the wearable device (102-1) at the first time point.

In some embodiments, the image content receiver (110) uses the first spatial position "p1" and/or the first spatial direction "z1" of the wearable device (102-1) at the first time point to select single-view images from the multi-view image into an image set. The image set represents a set that contains two, three, four, or more single-view images selected from the multi-view image. The two or more single-view images in the image set corresponding to two or more viewing directions in a corresponding set of two or more viewing directions supported by the multi-view image at the first time point.

By way of example but not limitation, the image set is a set of four images (or views) selected from the plurality of images of the multi-view image. The four images correspond to four viewing directions 202-10, 202-11, 202-5 and 202-12 that are the closest to the first spatial direction "z1" of the wearable device (102-1) at the first time point.

In some embodiments, a size of an angle between the first spatial direction "z1" and a viewing direction to which an image (or view) in the plurality of images (or views) of the multi-view image may be used to determine how close the viewing direction to which the image corresponds is relative to the first spatial direction "z1". In the present example, the four images in the image set may be selected as having the four smallest sizes of angles between the first spatial direction "z1" of the wearable device (102-1) and the viewing directions of the four images.

In some embodiments, image point patterns (or keystone shapes) on fiducial mark tracking images acquired by an image sensor on a wearable device may be directly used to select single-view images from the multi-view image to be included in the image set. For example, the image points (e.g., 172-1 through 172-4, etc.) generated in response to the light rays from the fiducial marks (e.g., 170-1 through 170-4, etc.) may form a specific pattern (or keystone shape) with specific direction and shape characteristics (e.g., a particular polygonal shape, a particular two-dimensional pattern, a particular pattern with a specific orientation and aspect ratios in a two-dimensional image plane, etc.) at the image plane (178). The specific pattern (or keystone shape) with specific direction and shape characteristics may be used as a key or an index value to select specific single-view images from the plurality of single-view images of the multi-view image as the image set, instead of or in addition to selecting single-view images based on how close the actual viewing direction of the wearable device (102-1) is to viewing directions represented by the single-view images.

In some embodiments, the plurality of single-view images of the multi-view image may be relatively numerous or relatively dense (e.g., the multi-view image corresponds to a relatively dense light field image, etc.). In some embodiments, a different set of two or more images may be selected for a different eye in the left and right eyes of the viewer (112-1).

For example, a specific image point pattern (or keystone shape) may be generated in response to the fiducial marks by a respective image sensor of two separate image sensors for a respective eye of the left and right eyes of the viewer (112-1). The specific image point pattern (or keystone shape) may be used as a key or an index value to select specific four single-view images from the plurality of single-view images of the multi-view image as the image set for the respective eye of the left and right eyes of the viewer (112-1).

In some embodiments, the first spatial direction "z1" of the wearable device (102-1) at the first time point, as discussed above, may represent an actual viewing direction of the wearable device (102-1) from a center point of the wearable device (102-1); the center point of the wearable device (102-1) may corresponds to a center point of the interpupil distance of the viewer (112-1).

Additionally, optionally or alternatively, a first left spatial direction and a first right spatial direction of the wearable device (102-1) may be determined at the first time point for the wearable device (102-1), instead of or in addition to the first spatial direction "z1" that may represent a viewing direction from a central point of the wearable device (102-1) at the first time point. The first left spatial direction and the first right spatial direction of the wearable device (102-1) may respectively correspond to a left viewing direction of a left lens (or a left optical stack) of the wearable device (102-1) and a right viewing direction of a right lens (or a right optical stack) of the wearable device (102-1).

In some embodiments, each of the first left spatial direction and the first right spatial direction of the wearable device (102-1) may be determined based on respective image points generated (in response to fiducial marks) by a respective image sensor of two separate image sensors for a respective eye of the left and right eyes of the viewer (112-1).

In some embodiments, one or both of the first left spatial direction and the first right spatial direction of the wearable device (102-1) may be extrapolated from the first spatial direction "z1" of the wearable device (102-1).

Figure 2C:
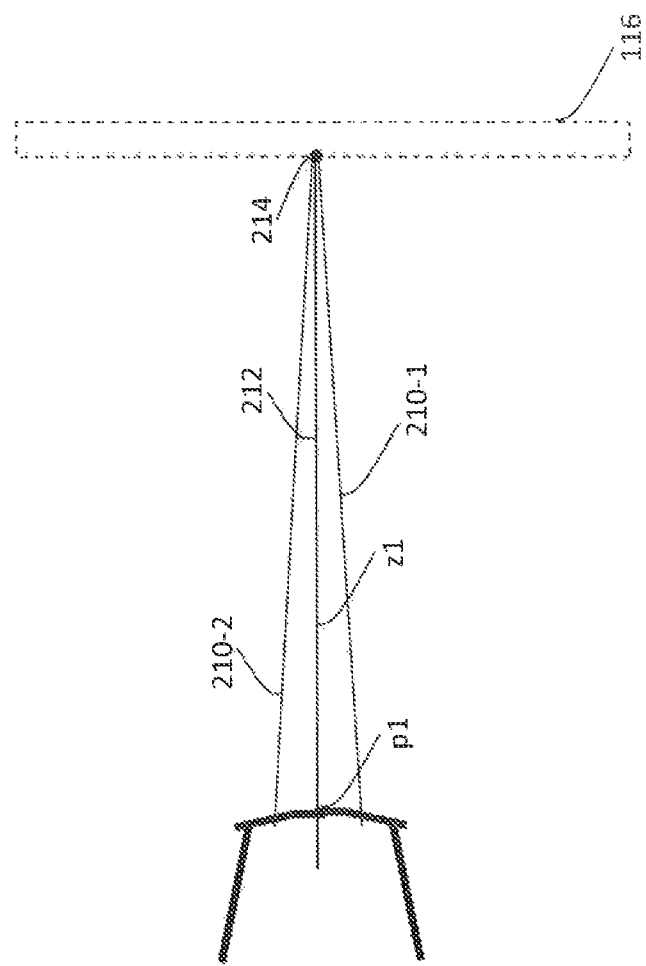
FIG. 2C illustrates example determinations of left and right spatial directions of a wearable device.

FIG. 2C illustrates example determinations of the first left spatial direction (e.g., 210-2, etc.) and the first right spatial direction (e.g., 210-1, etc.) of the wearable device (102-1). An offset angle (e.g., 212, etc.) between the first spatial direction "z1" and each of the first left spatial direction (210-2) and the first right spatial direction (210-1) of the wearable device (102-1) may be determined based on geometric relationships of these spatial directions with respect to a common reference plan. To compute the offset, these spatial directions may be deemed as converging to a point 214 at a zero-parallax (or zero disparity) plane such as the device display (116) at which the wearable device (102-1) is to rendered images. The offset (212) may be computed based on the distance between the device display (116) and the interpupil distance. By way of example but not limitation, the offset (212) may be computed in radians as one half of the interpupil distance divided by the distance between the device display (116) and the first spatial position "p1" on the wearable device (102-1). Thus, the first left spatial direction and the first right spatial direction of the wearable device (102-1) may be determined as the first spatial direction "z1" plus or minus the offset.

In some embodiments, each of the first left spatial direction and the first right spatial direction of the wearable device (102-1) may be provided to the image content receiver (110) and used by the image content receiver (110) to select respective single-view images from the plurality of single-view images in the multi-view image to be included in a respective image set for each eye of the viewer (112-1), instead of using the first spatial direction "z1" that is different from each of the first left spatial direction and the first right spatial direction of the wearable device (102-1).

Thus, specific single-view images selected based on the first left spatial direction into a left image set may be the same as, or may be different from, specific single-view images selected based on the first right spatial direction into a right image set. In some embodiments, both of the left image set and the right image set may be specifically respectively identified and included in the (overall) image set generated from the multi-view images, which can then be transmitted/streamed to downstream devices for generating display images to be rendered by wearable devices.

In some embodiments, the first spatial direction "z1" may represent a spatial direction of one of the left and right lenses (or optical stacks) of the wearable device (102-1). In these embodiments, the other spatial direction of the other of the left and right lenses (or optical stacks) of the wearable device (102-1) may be determined by extrapolating the first spatial direction "z1" with an offset, by using a separate image point pattern generated by a separate image sensor for the other spatial direction of the other of the left and right lenses (or optical stacks) of the wearable device (102-1), etc.

Additionally, optionally or alternatively, instead of using the first left spatial direction and the first right spatial direction of the wearable device (102-1) to select two image sets (one for the left side of the wearable device (102-1) and the other for the right side of the wearable device (102-1) of single-view images from the plurality of single-view images in the multi-view image, one or both of the image sets may be selected using respective image point patterns (or keystone shapes) as keys. For example, a left image point pattern (or left keystone shape) generated by a left image sensor may be used as a key or an index value to select specific single-view images from the plurality of single-view images of the multi-view image for the left side of the wearable device (102-1) into the left image set. A right image point pattern (or right keystone shape) generated by a right image sensor may be used as another key or another index value to select specific single-view images from the plurality of single-view images of the multi-view image for the right side of the wearable device (102-1) into the right image set.

6. Image Reconstruction Based on Image Set

Figure 3A:
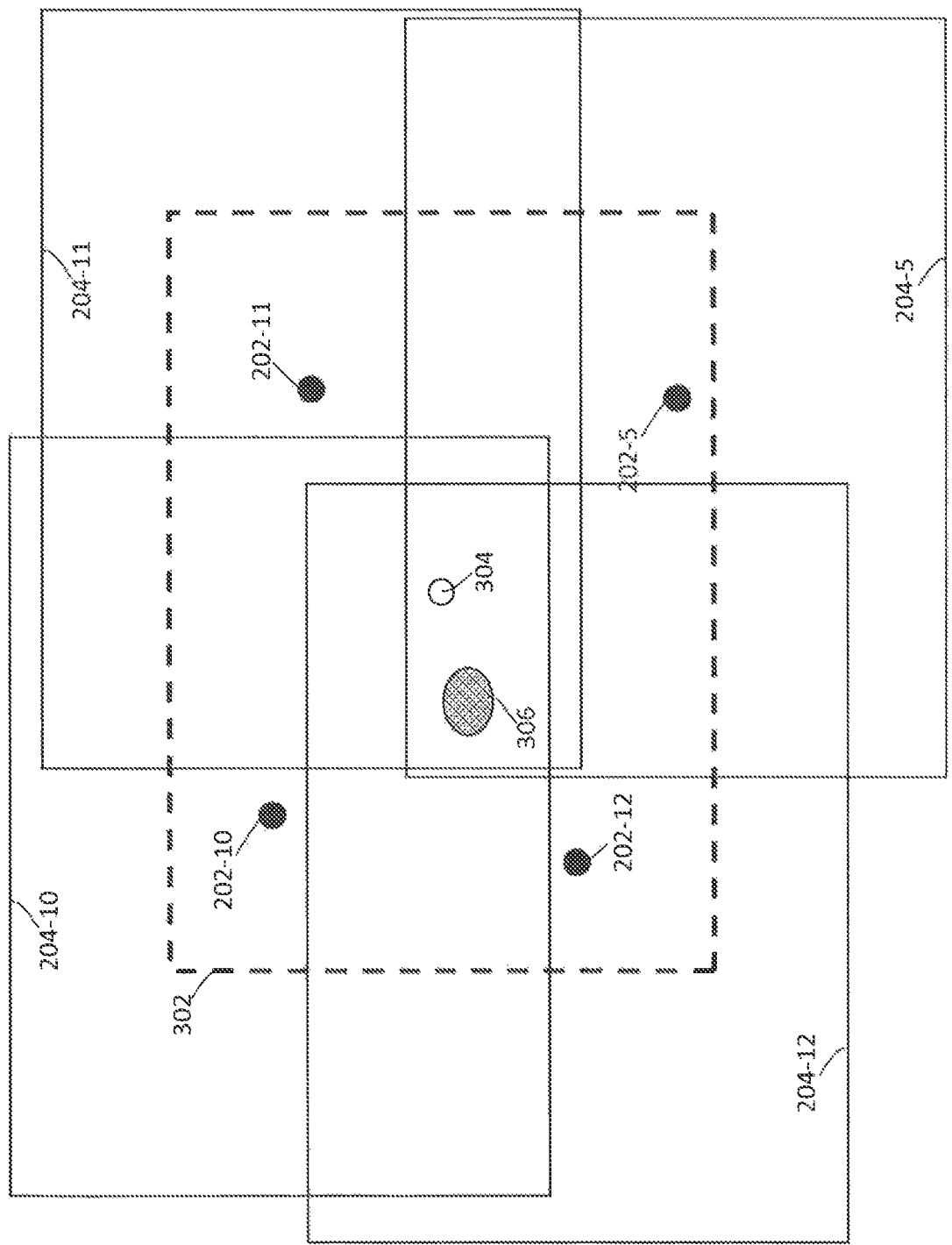
FIG. 3A illustrates example determinations of a display image to be rendered on a device display of a wearable device.

FIG. 3A illustrates example determinations of a display image to be rendered on a device display (e.g., 116, etc.) of a wearable (image rendering) device (e.g., 102, 102-1, 102-2, etc.). It should be noted that in various embodiments any combination of a wide variety of image reconstruction techniques and/or image interpolation techniques may be used to generate, based on an image set generated from a multi-view image, a display image (e.g., 302) with a viewing direction (e.g., 304, etc.) that may be different from all viewing angles in the plurality of viewing angles supported by the multi-view image.

The image reconstruction techniques and/or image interpolation techniques used to generate display images may include, but are not necessarily limited to only, image reconstruction and/or image interpolation based on depth image based rendering (DIBR), image reconstruction and/or image interpolation based on depth-based image rendering (DBIR), image reconstruction and/or image interpolation based on point-based image rendering, image reconstruction and/or image interpolation based on sparse light field (LF) images, image reconstruction and/or image interpolation based on LF reconstruction, image reconstruction and/or image interpolation based on geometric mappings such as conformal mappings, etc.

For example, the image set comprises the single-view images (e.g., 204-10, 204-11, 204-12, 204-5, etc.) respectively corresponding to the viewing directions (e.g., 202-10, 202-11, 202-12, 202-5, etc.) in the plurality of viewing directions (e.g., 202-1 through 202-12, etc.) supported by the multi-view image, as illustrated in FIG. 2B.

In some embodiments, an image renderer (e.g., 108-1, 108-2, etc.) generates one or two display images (e.g., 302, etc.) from the image set based on image interpolation. In operational scenarios in which the wearable device (e.g., 102-1, etc.) is to display monoscopic images, one display image may be generated to be displayed to both of the left and right eyes of the viewer (e.g., 112-1, etc.). In operational scenarios in which the wearable device (e.g., 102-1, etc.) is to display stereoscopic images, two display images, namely a left view display image and a right view display image, may be generated to be rendered/displayed to the left and right eyes of the viewer (e.g., 112-1, etc.), respectively. By way of example but not limitation, the display image (302) represents one of the left view display image and the right view display image; the other of the left view display image and the right view display image may be similarly generated.

In some embodiments, the image renderer (e.g., 108-1, 108-2, etc.) receives or generates depth information for pixels in each of the single-view images (204-10, 204-11, 204-12 and 204-5) in the image set. For example, the depth information may be received or generated by the image content receiver (110), and may be included as a part of the image set generated by the image content receiver (110). The image renderer (e.g., 108-1, 108-2, etc.) may receive the depth information from the image content receiver (110) along with the image set.

Additionally, optionally or alternatively, the image renderer (e.g., 108-1, 108-2, etc.) can generate the depth information based on disparity information represented in the single-layer images (204-10, 204-11, 204-12 and 204-5) in the image set. In some embodiments, the disparity information may be provided to the image renderer (e.g., 108-1, 108-2, etc.) and/or the image content receiver (110) as a part of the input multi-view image that was used to generate the image set. In some other embodiments, the disparity information may be generated by the image renderer (e.g., 108-1, 108-2, etc.) and/or the image content receiver (110) by analyzing pixel correspondence relationships among the single-view images of the image set based on intensity and/or chromaticity information in the pixels of the single-view images of the image set. The disparity information may be obtained as a solution based on minimizing a cost function defined based on intensity/chromaticity differences of pixels from different single-view images in the image set.

Image-related geometric information such as the depth of an image plane at which each of the single-layer images in the image set is captured, the optical center of an image acquisition device used to acquire a single-layer image, a focal length of the image acquisition device, a depth at which the device display of the wearable device (102-1) is located relative to the viewer (112-1), the spatial location and/or spatial direction of the wearable device (102-1), camera geometric information used to capture the images, etc., may be used to translate the disparate information among the pixels of the images of the image set into the depth information for each of the images in the image set. Some or all of the image related geometric information may be provided to the image content receiver (110) and/or the image renderer (e.g., 108-1, 108-2, etc.) as a part of the input multi-view image used to generate the image set.

Based on depth information of pixels of a single-view image (e.g., 204-10, etc.) in the image set and the image related geometric information, the single-layer image (204-10) may be translated/rotated into a candidate display image for the display image (302). Similarly, any, some, or all of the other single-view images (e.g., 204-11, 204-12 and 204-5, etc.) in the image set may be translated/rotated into candidate display image(s) for the display image (302). Some image portions may be occluded in one single-layer image in the image set but may be available from other single-layer image(s), because of the difference of viewing directions between the image in the image set and the display image (302). Thus, otherwise occluded image portions in a display image interpolated from one single-view image may be disoccluded or made visible using non-occluded image portions from other single-view images in the image set.

In some embodiments, a single-view image (in the image set) with a viewing direction that is the closest to the viewing direction (304) of the display image (302) may be used as a base image to generate or interpolate into the display image (302), while the other images may be used to supplement any missing pixels that should be in the display image (302) because of the difference of viewing directions between the base image and the display image (302).

In some embodiments, a wearable device (e.g., 102-1, etc.) comprises one or more gaze tracking devices that track and collect gaze direction data in real time at runtime for determining gaze directions (e.g., left eye gaze direction and right eye gaze direction, etc.) of a viewer (e.g., 112-1, etc.) contemporaneous with the rendered/displayed images with the wearable device (102-1). The left eye gaze direction and the right eye gaze direction of the viewer (112-1) may be different from the spatial direction of the wearable device (102-1) as well as from the left view spatial direction of the left view optical stacks or the right view spatial direction of the right view optical stacks of the wearable device (102-1).

Example gaze tracking devices may include, but are not necessarily limited to only: any of: gaze tracking devices based on acquiring light absorption images/maps of the eye(s), gaze tracking devices based on acquiring light reflection images/maps of the eye(s), gaze tracking devices using one or more light wavelengths that can penetrate different depths in eye(s), etc. A gaze tracking device as described herein may be personalized and/or calibrated to take into consideration individual vision/gaze characteristics of the viewer (112-1). In some embodiments, the gaze tracking device may be incorporated into another device such as the wearable device (102-1), an inside-out tracking device therewith, etc.

As previously noted, the gaze directions of the viewer (112-1) may or may not coincide with a first left spatial direction of (e.g., the left lens or the left optical stack in, etc.) the wearable device (102-1) and a first right spatial direction of (e.g., the right lens or the right optical stack in, etc.) the wearable device (102-1). By way of illustration but not limitation, at the first timepoint, a gaze direction of the viewer (112-1) that is to gaze into the display image (302) may be determined to be (e.g., at a center point, at a point of symmetry, etc.) within a focus region 306 away from the viewing direction (304) that is used to select the images in the image set used to construct the display image (302).

In some embodiments, an image set as described herein may comprise N subsets of single-view images, where N is a positive integer. A single-view image in the image set or any subset of single-view images therein may comprise a set of pixel values at a set of pixel positions in an image frame. Such image frame may have a spatial shape including, but not necessarily limited to only, any of: rectangles, polygonal shapes, regular shapes, irregular shapes, etc.

In some embodiments, one or more single-view images in the image set or any subset of images therein may be encoded into a hierarchical image representation in which different image hierarchies may have different spatial shapes, different sizes, different aspect ratios, different spatial resolutions, different image refresh rates, different dynamic ranges, etc. Additionally, optionally or alternatively, different single-view images in the image set may be transmitted or streamed from different devices (e.g., local devices, remote devices, dedicated devices, shared devices, etc.) over different data/network connections (e.g., local connections, remote connections, dedicated connections, shared connections, etc.) to a recipient device such as an image renderer (e.g., 108-1, 108-2, etc.), a wearable device (e.g., 102, 102-1, 102-2, etc.).

Examples of focal regions, non-focal regions, image hierarchies (or image layers), etc., can be found, for example, in U.S. Provisional Patent Application No. 62/435,997, filed on Dec. 19, 2016, the entire contents of which are hereby incorporated by reference as if fully set forth herein.

7. Transmitting Image Sets with Low Bandwidth

Figure 3B:
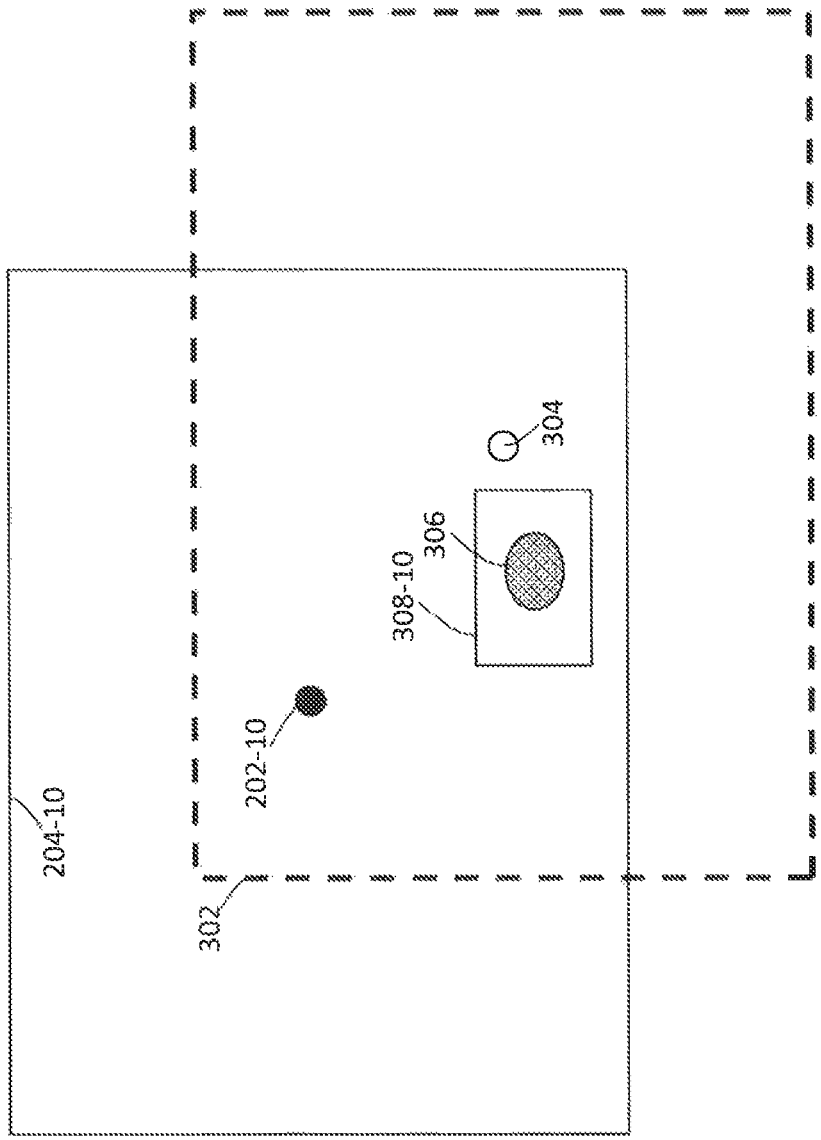
FIG. 3B illustrates example image reconstruction based on single-view images of different subset of images in an image set.

FIG. 3B illustrates an example single-view image (e.g., 204-10, etc.) in a first subset of single-view images in an image set as described herein and an example second single-view image (e.g., 308-10, etc.) in a second subset of single-view images in the same image set.

In an example, both of the single-view image (204-10) and the second single-view image (308-10) may be derived from the same single-view image that corresponds to the same viewing direction (202-10) in the plurality of single-view images of the multi-view image from which the image set is derived. In another example, the single-view image (204-10) and the second single-view image (308-10) may be respectively derived from two single-view images (e.g., with different levels of spatial resolutions, dynamic ranges, color gamuts, etc.) that correspond to the same viewing direction (202-10) in the plurality of single-view images of the multi-view image.

In some embodiments, the single-view image (204-10) is a relatively low quality image, which may represent a downsampled version of an original non-sampled version of a single-view image of the viewing direction (202-10) among the plurality of single-view images of the multi-view image. Since the single-view image (204-10) is likely to contain much less data than the single-view image from which the image (204-10) was downsampled, the image (204-10) may be transmitted/streamed between devices relatively fast even given a relatively constrained bit rate.

In some embodiments, the second single-view image (308-10) is a relatively high quality image (e.g., the highest quality image available, etc.), which may represent an image portion in an original non-sampled version of the image of the viewing direction (202-10) among the plurality of images (or views) of the multi-view image. The image portion represented in the second image (308-10) may cover a relatively small field of view, for example, just covering the focus region (306) of a respective eye of the viewer (112-1). Thus, the second single-view image (308-10) is also likely to contain much less data than the image from which the image portion represented in the image (308-10) is extracted, the image (308-10) may also be transmitted/ streamed between devices relatively fast even given a relatively constrained bit rate.

The first subset of images may further comprise downsampled single-view images (e.g., 204-11, 204-12 and 204-5, etc.) in the image set as illustrated in FIG. 3A. The second subset of images may further comprise non-downsampled single-view (partial) images in addition to the second single-view (partial) image (308-10).

For example, the first subset of single-view images may comprise downsampled single-view images (e.g., 204-10, etc.), each of which covers a relatively large field of view comparable with, or even exceeding most if not all of, the entire field of view supported by a respective imager in the wearable device (102-1). The second subset of single-view (partial) images comprise single-view images (e.g., 308-10, etc.), each of which covers a relatively small field of view, for example, just covering the focus region (306) of the respective eye of the viewer (112-1).

Image reconstruction/interpolation as illustrated in connection with FIG. 3A may be applied similarly to generate/ reconstruct a relatively low quality image from the first subset of single-view images that covers the field of view supported by the respective imager, and to further generate/ reconstruct a relatively high quality (partial) image from the second subset of single-view (partial) images that covers the focus region (306) of the respective eye of the viewer (112-1) in line with the gaze direction of each of the left and right eyes of the viewer (112-1).

The relative low quality image for the field of view supported by the respective imager and the relatively high quality image for the focus region (306) of the respective eye of the viewer (112-1) in line with the gaze direction of each of the left and right eyes of the viewer (112-1) may be superimposed, combined to generate a single overall display image to be rendered by the respective imager. For example, the relatively low quality display image may be first upsampled to the relatively high spatial resolution of the relatively high quality image and then combined with the relatively high quality image at the same relatively high spatial resolution; any pixel that does not exist in the relatively high quality image may be provided by a pixel from the relatively low quality image. Additionally, optionally or alternatively, one or more image processing operations including but not necessarily limited to image blending, image mixing, blurring, de-banding, deblocking, morphological operations, noise processing operations, disocclusion/occlusion algorithms, etc., may be applied as a part of generating the overall display image from the relatively low quality image for the field of view and the relatively high quality image for the focus region (306).

8. Example Process Flows

FIG. 4A illustrates an example process flow according to an example embodiment of the present invention. In some example embodiments, one or more computing devices or components may perform this process flow. In block 402, an image processing device (e.g., an image content receiver, an image renderer, a wearable device, etc.) determines a spatial direction of a wearable device, the spatial direction of the wearable device representing an actual viewing direction of the wearable device at a first time point.

In block 404, the image processing device uses the spatial direction of the wearable device that represents the actual viewing direction of the wearable device to select, from a multi-view image comprising a plurality of single-view images, a set of two or more single-view images corresponding to a set of two or more viewing directions at the first time point. Each single-view image in the plurality of single-view images in the multi-view image (a) corresponds to a respective viewing direction in a plurality of viewing directions and (b) represents a view of the multi-view image from the respective viewing direction.

In block 406, the image processing device causes a display image to be rendered on a device display of the wearable device. The display image represents a single-view image as viewed from the actual viewing direction of the wearable device at the first time point. The display image is constructed based at least in part on the spatial direction of the wearable device and the set of two or more single-view images corresponding to the set of two or more viewing directions.

In an embodiment, the plurality of single-view images of the multi-view image is received with depth information for the plurality of single-view images; the display images are constructed based further on the depth information.

In an embodiment, the spatial direction of the wearable device is determined based on one or more spatial coordinates of the wearable device; the one or more spatial coordinates of the wearable device comprise one of: one or more rotational coordinates only, a combination of translational coordinates and rotational coordinates, etc.

In an embodiment, single-view images in the set of two or more single-view images are selected based further on a spatial position of the wearable device.

In an embodiment, the spatial direction of the wearable device is determined in relation to a reference coordinate system of a 3D space in which the wearable device resides.

In an embodiment, the plurality of viewing directions supported by the plurality of single-view images of the multi-view image forms a solid angle in relation to a viewer of the wearable device.

In an embodiment, the display image comprises a left view display image and a right view display image that form a stereoscopic image.

In an embodiment, a cinema display image depicting a first proper subset of visual objects in a plurality of visual objects in a 3D image space; the display image represents a device display image that depicts one or more second proper subsets of visual objects in the plurality of visual objects in the 3D image space; the cinema display image is concurrently rendered on a cinema display for viewing by a viewer while the display image is rendered on the device display of the wearable device for viewing by the same viewer.

In an embodiment, the cinema display image depicting the first proper subset of visual objects in the plurality of visual objects in the 3D image space is received in a cinema image layer of a multi-layer multi-view video signal; the image set used to construct the display image is received in one or more device image layers of the multi-layer multi-view video signal.

In an embodiment, the image processing device is further configured to perform: receiving timing information associated with the cinema display image; using the timing information to synchronize rendering the cinema display image and the device display image.

In an embodiment, the display image is constructed by interpolating single-view images in the image set based on the spatial direction of the wearable device.

In an embodiment, the image set includes a subset of relatively low resolution images each of which covers a relatively large field of view and a subset of relatively high resolution images each of which covers a relatively small focus region of a viewer.

In an embodiment, the display image is constructed by the wearable device.

In an embodiment, the display image is constructed by a video streaming server that streams the display image to the wearable device.

In an embodiment, the image set is transmitted from a video streaming server to the wearable device.

In an embodiment, the plurality of single-view images is received locally from a storage device accessible to the wearable device.

FIG. 4B illustrates an example process flow according to an example embodiment of the present invention. In some example embodiments, one or more computing devices or components may perform this process flow. In block 452, an image processing device (e.g., an image content receiver, an image renderer, a wearable device, etc.) determines a spatial direction of a wearable device, the spatial direction of the wearable device representing an actual viewing direction of the wearable device at a first time point.

In block 454, the image processing device receives a set of two or more single-view images corresponding to a set of two or more viewing directions at the first time point. The spatial direction of the wearable device is used to select, from a multi-view image comprising a plurality of single-view images, single-view images into the set of two or more single-view images. Each single-view image in the plurality of single-view images in the multi-view image (a) corresponds to a respective viewing direction in a plurality of viewing directions and (b) represents a view of the multi-view image from the respective viewing direction.

In block 456, the image processing device constructs a display image based at least in part on the spatial direction of the wearable device and the set of two or more single-view images corresponding to the set of two or more viewing directions. The display image is rendered on a device display of the wearable device. The display image represents a single-view image as viewed from the actual viewing direction of the wearable device at the first time point.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

9. Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
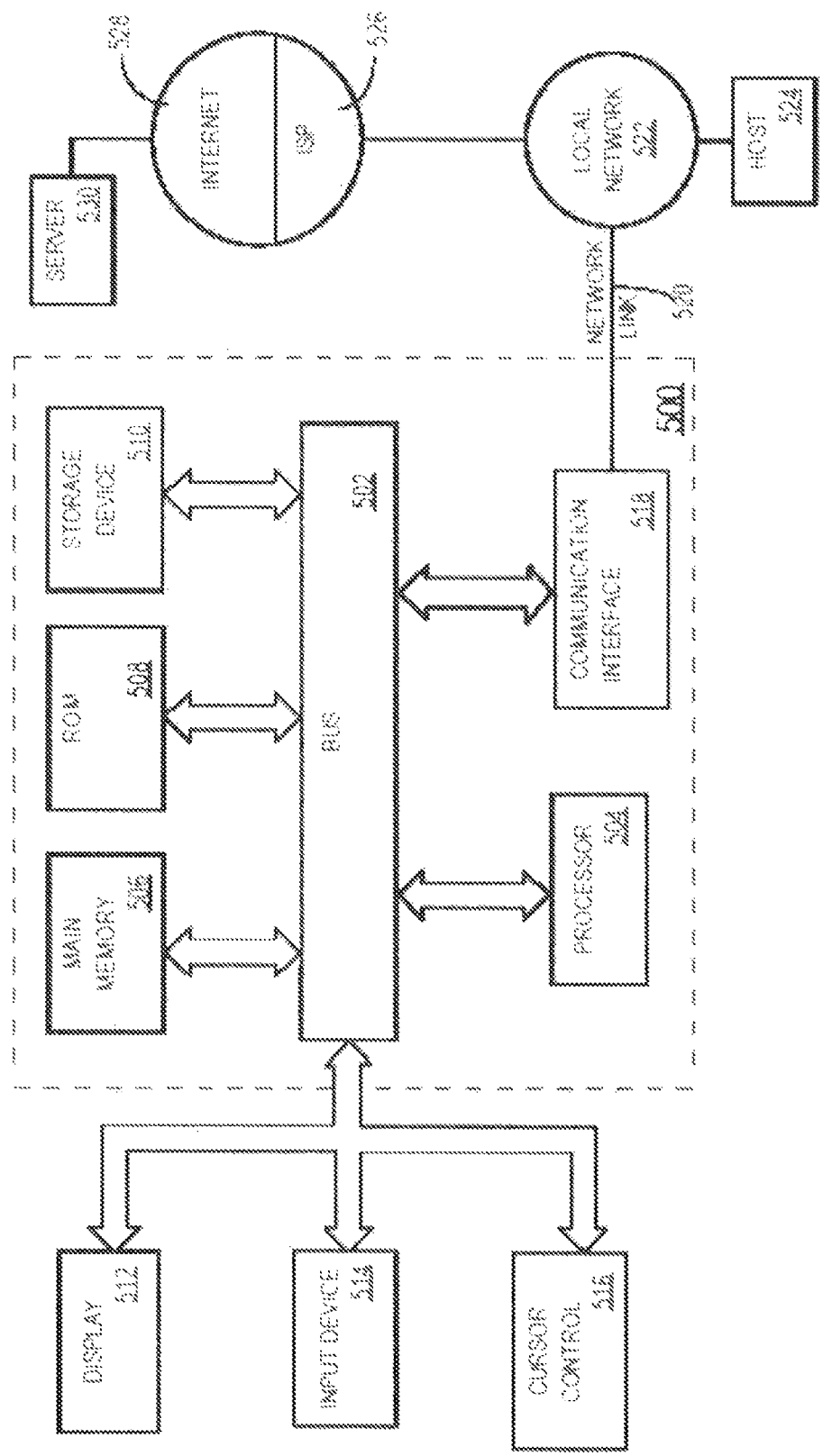
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer viewer. An input device 514, including alphanumeric and other keys, is coupled to bus 502 for communicating information and command selections to processor 504. Another type of viewer input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

10. Equivalents, Extensions, Alternatives and Miscellaneous

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
    determining a spatial direction of a wearable device, the spatial direction of the wearable device representing an actual viewing direction of the wearable device at a first time point;
    using the spatial direction of the wearable device that represents the actual viewing direction of the wearable device to select, from a multi-view image comprising a plurality of single-view images, a set of two or more single-view images corresponding to a set of two or more viewing directions at the first time point, each single-view image in the plurality of single-view images in the multi-view image (a) corresponding to a respective viewing direction in a plurality of viewing directions and (b) representing a view of the multi-view image from the respective viewing direction;
    wherein the set of two or more single-view images as selected from the multi-view image depicts a plurality of visual objects at different depths in a three-dimensional space;
    wherein no single-view image in the set of two or more single-view images as selected from the multi-view image using the spatial direction of the wearable device is of a viewing direction that is same as the spatial direction of the wearable device;
    wherein a first single-view image in the set of two or more single-view images includes a view portion, of the multi-view image, disoccluded in the first single-view image but occluded in a second single-view image in the set of two or more single-view images;
    causing a display image to be rendered on a device display of the wearable device, the display image representing a single-view image as viewed from the actual viewing direction of the wearable device at the first time point, the display image being constructed based at least in part on the spatial direction of the wearable device and the set of two or more single-view images corresponding to the set of two or more viewing directions.

2. The method of claim 1, wherein the plurality of single-view images of the multi-view image is received with depth information for the plurality of single-view images, and wherein the display images are constructed based further on the depth information.

3. The method of claim 1, wherein the spatial direction of the wearable device is determined based on one or more spatial coordinates of the wearable device, and wherein the one or more spatial coordinates of the wearable device comprise one of: one or more rotational coordinates only, or a combination of translational coordinates and rotational coordinates.

4. The method of claim 1, wherein single-view images in the set of two or more single-view images are selected based further on a spatial position of the wearable device.

5. The method of claim 1, wherein the spatial direction of the wearable device is determined in relation to a reference coordinate system of a 3D space in which the wearable device resides.

6. The method of claim 1, wherein the plurality of viewing directions supported by the plurality of single-view images of the multi-view image forms a solid angle in relation to a viewer of the wearable device.

7. The method of claim 1, wherein the display image comprises a left view display image and a right view display image that form a stereoscopic image.

8. The method of claim 1, wherein a cinema display image depicting a first proper subset of visual objects in a plurality of visual objects in a 3D image space; wherein the display image represents a device display image that depicts one or more second proper subsets of visual objects in the plurality of visual objects in the 3D image space; and wherein the cinema display image is concurrently rendered on a cinema display for viewing by a viewer while the display image is rendered on the device display of the wearable device for viewing by the same viewer.

9. The method of claim 8, wherein the cinema display image depicting the first proper subset of visual objects in the plurality of visual objects in the 3D image space is received in a cinema image layer of a multi-layer multi-view video signal, and wherein the image set used to construct the display image is received in one or more device image layers of the multi-layer multi-view video signal.

10. The method of claim 8, further comprising:
receiving timing information associated with the cinema display image;
using the timing information to synchronize rendering the cinema display image and the device display image.

11. The method of claim 1, wherein the display image is constructed by interpolating single-view images in the image set based on the spatial direction of the wearable device.

12. The method of claim 1, wherein the image set includes a subset of relatively low resolution images each of which covers a relatively large field of view and a subset of relatively high resolution images each of which covers a relatively small focus region of a viewer.

13. The method of claim 1, wherein the display image is constructed by the wearable device.

14. The method of claim 1, wherein the display image is constructed by a video streaming server that streams the display image to the wearable device.

15. The method of claim 1, wherein the image set is transmitted from a video streaming server to the wearable device.

16. The method of claim 1, wherein the plurality of single-view images is received locally from a storage device accessible to the wearable device.

17. A method, comprising:
determining a spatial direction of a wearable device, the spatial direction of the wearable device representing an actual viewing direction of the wearable device at a first time point;
receiving a set of two or more single-view images corresponding to a set of two or more viewing directions at the first time point, the spatial direction of the wearable device being used to select, from a multi-view image comprising a plurality of single-view images, single-view images into the set of two or more single-view images, each single-view image in the plurality of single-view images in the multi-view image (a) corresponding to a respective viewing direction in a plurality of viewing directions and (b) representing a view of the multi-view image from the respective viewing direction;
wherein the set of two or more single-view images as selected from the multi-view image depicts a plurality of visual objects at different depths in a three-dimensional space;
wherein no single-view image in the set of two or more single-view images as selected from the multi-view image using the spatial direction of the wearable device is of a viewing direction that is same as the spatial direction of the wearable device;
wherein a first single-view image in the set of two or more single-view images includes a view portion, of the multi-view image, disoccluded in the first single-view image but occluded in a second single-view image in the set of two or more single-view images;
constructing a display image based at least in part on the spatial direction of the wearable device and the set of two or more single-view images corresponding to the set of two or more viewing directions, the display image being rendered on a device display of the wearable device, the display image representing a single-view image as viewed from the actual viewing direction of the wearable device at the first time point.

18. A non-transitory computer readable storage medium, storing software instructions, which when executed by one or more processors cause performance of the method recited in claim 17.

19. A computing device comprising one or more processors and one or more storage media, storing a set of instructions, which when executed by one or more processors cause performance of the method recited in claim 17.

* * * * *